(12) United States Patent
Fujimori et al.

(10) Patent No.: US 9,183,699 B2
(45) Date of Patent: Nov. 10, 2015

(54) GAMING SYSTEM WITH COMMON DISPLAY AND CONTROL METHOD OF GAMING SYSTEM

(75) Inventors: Kenichi Fujimori, Tokyo (JP); Arata Ajiro, Tokyo (JP); Tsuyoshi Ohira, Tokyo (JP)

(73) Assignee: UNIVERSAL ENTERTAINMENT CORPORATION, Tokyo (JP)

( * ) Notice: Subject to any disclaimer, the term of this patent is extended or adjusted under 35 U.S.C. 154(b) by 1548 days.

(21) Appl. No.: 12/251,777

(22) Filed: Oct. 15, 2008

(65) Prior Publication Data
US 2009/0239628 A1 Sep. 24, 2009

Related U.S. Application Data

(60) Provisional application No. 61/037,885, filed on Mar. 19, 2008.

(51) Int. Cl.
| | |
|---|---|
| A63F 13/00 | (2014.01) |
| A63F 9/24 | (2006.01) |
| G07F 17/32 | (2006.01) |
| A63F 13/40 | (2014.01) |
| A63F 13/30 | (2014.01) |

(52) U.S. Cl.
CPC ............ G07F 17/3223 (2013.01); A63F 13/10 (2013.01); A63F 13/12 (2013.01); G07F 17/3211 (2013.01); G07F 17/3258 (2013.01); G07F 17/3272 (2013.01)

(58) Field of Classification Search
CPC ............ G07F 17/3211; G07F 17/3258; G07F 17/3272; A63F 13/12; A63F 13/10
USPC .......................................................... 463/20
See application file for complete search history.

(56) References Cited

U.S. PATENT DOCUMENTS

| | | | |
|---|---|---|---|
| 5,820,459 A | 10/1998 | Acres et al. | |
| 6,695,697 B1 | 2/2004 | Okada | |
| 2002/0187836 A1* | 12/2002 | Meyer | ............................ 463/42 |
| 2003/0073486 A1 | 4/2003 | Okada | |

(Continued)

Primary Examiner — Kang Hu
Assistant Examiner — Marcus Jones
(74) Attorney, Agent, or Firm — KMF Patent Services, PLLC; Kenneth M. Fagin, Esq.; S. Peter Konzel, Esq.

(57) ABSTRACT

A gaming system of the present invention includes: a plurality of gaming machines; and a common display device connected to the gaming machines, each of the gaming machines, comprising: a display device for displaying a plurality of symbols; a controller, which performs processes of: (a) executing a base game in which symbols arranged on the display device are rearranged after a gaming medium has been betted, and thereafter a payment is made in accordance with the rearranged symbols; (b) counting number of times of executing the base game; (c) causing the display device to display a countdown effect image stored in a memory, while the counted number of times of executing the base game reaches a second predetermined value after reaching a first predetermined value; and (d) transferring the base game to a free game executed without betting a gaming medium, in a case where the number of times of executing the base game reaches the second predetermined value; and a communication interface for notifying to the common display the controller-counted number of times of executing the base game, the common display device, comprising: a communication interface for receiving notification from each of the gaming machines; a memory for storing a countdown effect image for each of the gaming machines; and a controller, which performs processes of: (a') judging whether or not there exist a plurality of gaming machines at which number of times of executing the base game reaches the first predetermined value, based upon the number of times of executing the base game, which is notified from each of the gaming machine; and (b') preferentially displaying a countdown effect image for a gaming machine with a smaller number of times of executing the base game, which is to be executed until a transfer to the free game.

9 Claims, 19 Drawing Sheets

(56) References Cited

U.S. PATENT DOCUMENTS

2006/0046821 A1* 3/2006 Kaminkow et al. ............ 463/16
2007/0060247 A1* 3/2007 Low et al. ..................... 463/16
2007/0060277 A1* 3/2007 Okada ........................... 463/17
2008/0254858 A1* 10/2008 Fujimoto et al. ............... 463/20

* cited by examiner

FIG.3

|  | PAY TABLE | | | 1BET | 2BET | MAX(3)BET |
|---|---|---|---|---|---|---|
| 1 | DOUBLE | DOUBLE | DOUBLE | 800 | 1600 | 2400 |
| 2 | DOUBLE | DOUBLE | 3BAR | 240 | 480 | 720 |
| 3 | DOUBLE | 3BAR | 3BAR | 120 | 240 | 360 |
| 4 | 3BAR | 3BAR | 3BAR | 60 | 120 | 180 |
| 5 | DOUBLE | DOUBLE | 2BAR | 120 | 240 | 360 |
| 6 | DOUBLE | 2BAR | 2BAR | 60 | 120 | 180 |
| 7 | 2BAR | 2BAR | 2BAR | 30 | 60 | 90 |
| 8 | DOUBLE | DOUBLE | 1BAR | 60 | 120 | 180 |
| 9 | DOUBLE | 1BAR | 1BAR | 30 | 60 | 90 |
| 10 | 1BAR | 1BAR | 1BAR | 15 | 30 | 45 |
| 11 | DOUBLE | ANY BAR | ANY BAR | 10 | 20 | 30 |
| 12 | ANY BAR | ANY BAR | ANY BAR | 5 | 10 | 15 |
| 13 | DOUBLE | DOUBLE | CHERRY | 80 | 160 | 240 |
| 14 | DOUBLE | CHERRY | CHERRY | 40 | 80 | 120 |
| 15 | CHERRY | CHERRY | CHERRY | 20 | 40 | 60 |
| 16 | DOUBLE | CHERRY | ANY | 10 | 20 | 30 |
| 17 | CHERRY | CHERRY | ANY | 5 | 10 | 15 |
| 18 | CHERRY | ANY | ANY | 2 | 4 | 6 |
| 19 | GIFT BONUS | | | 44.138 | 44.138 | 44.138 |

FIG.8
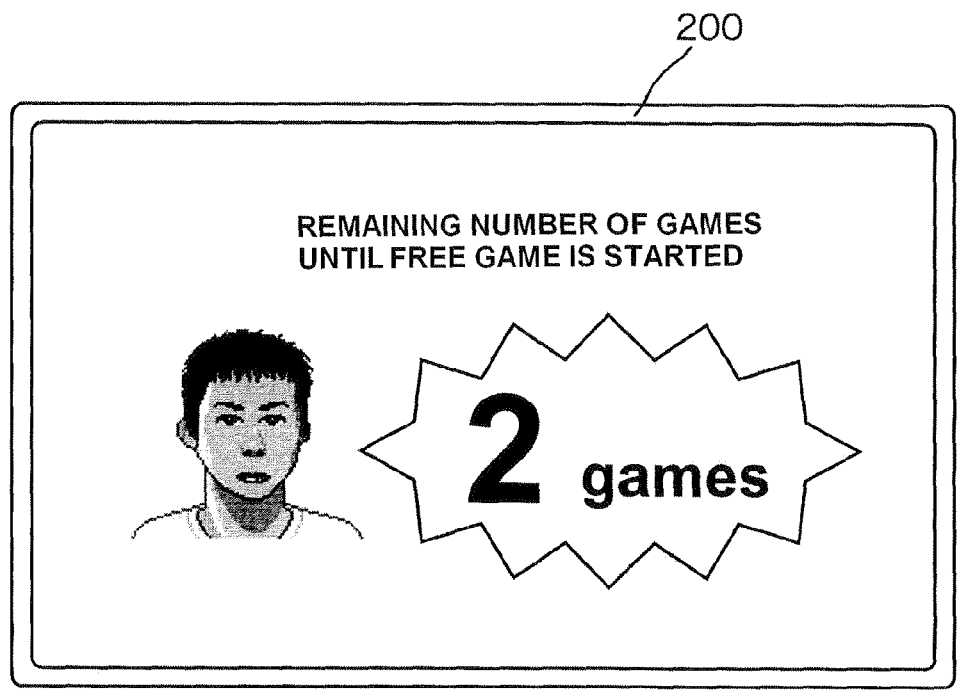
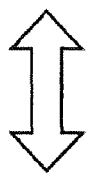 TIME-BASED CHANGE
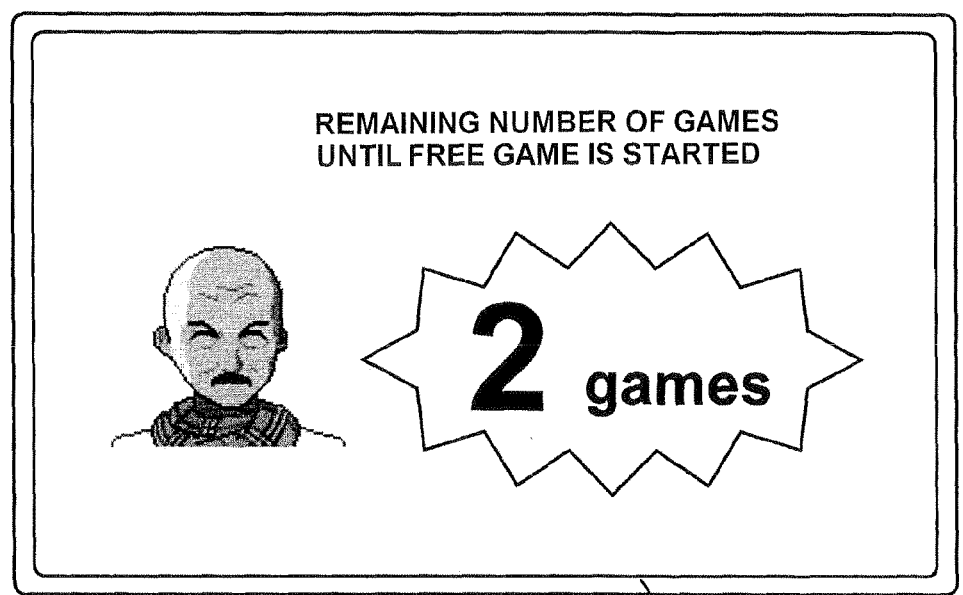

FIG.11
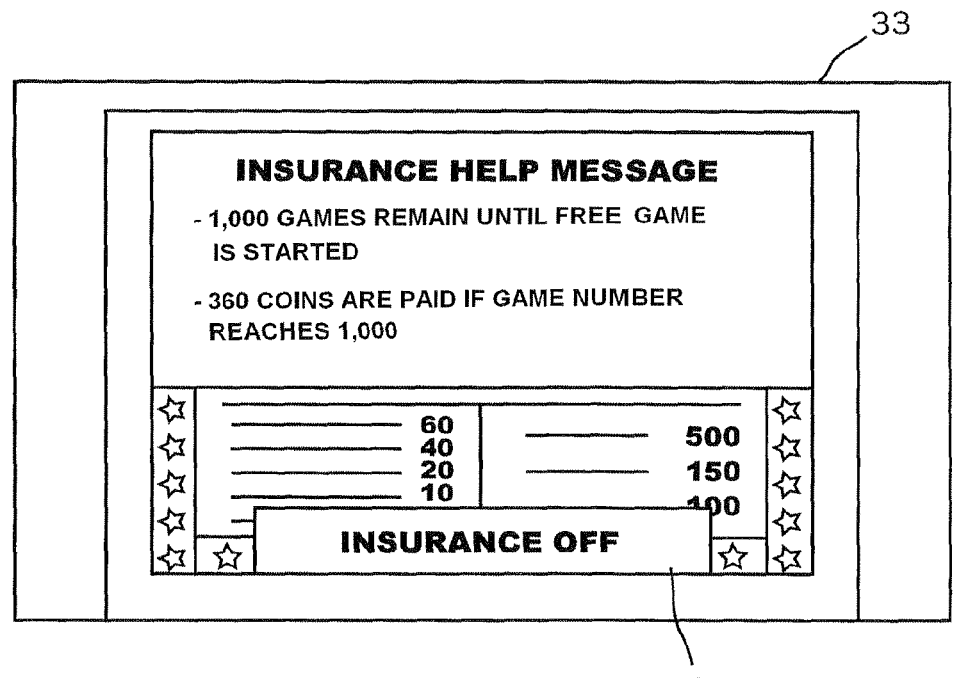
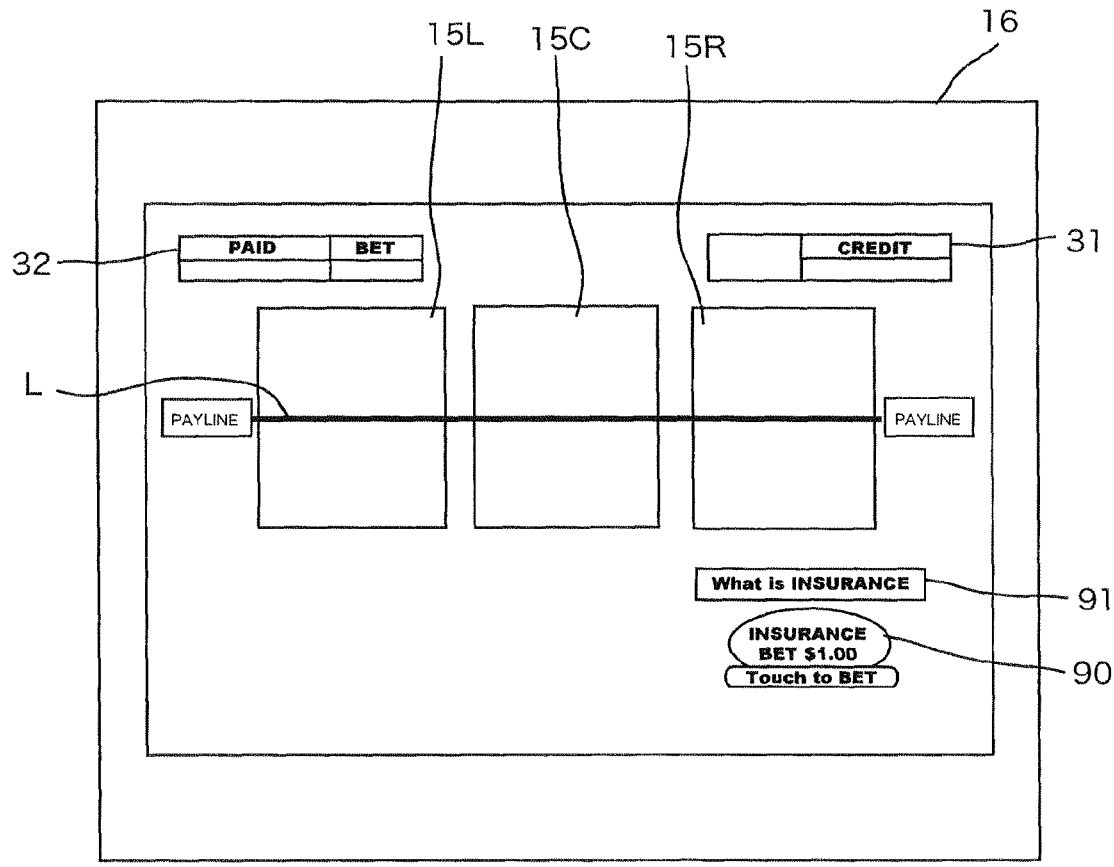

FIG.12
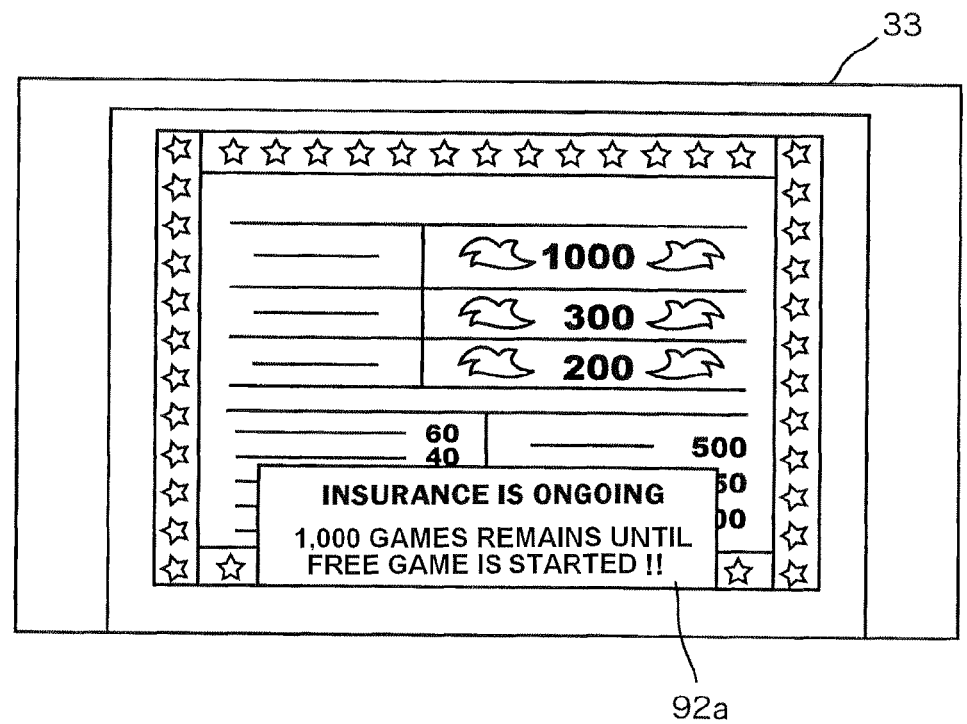
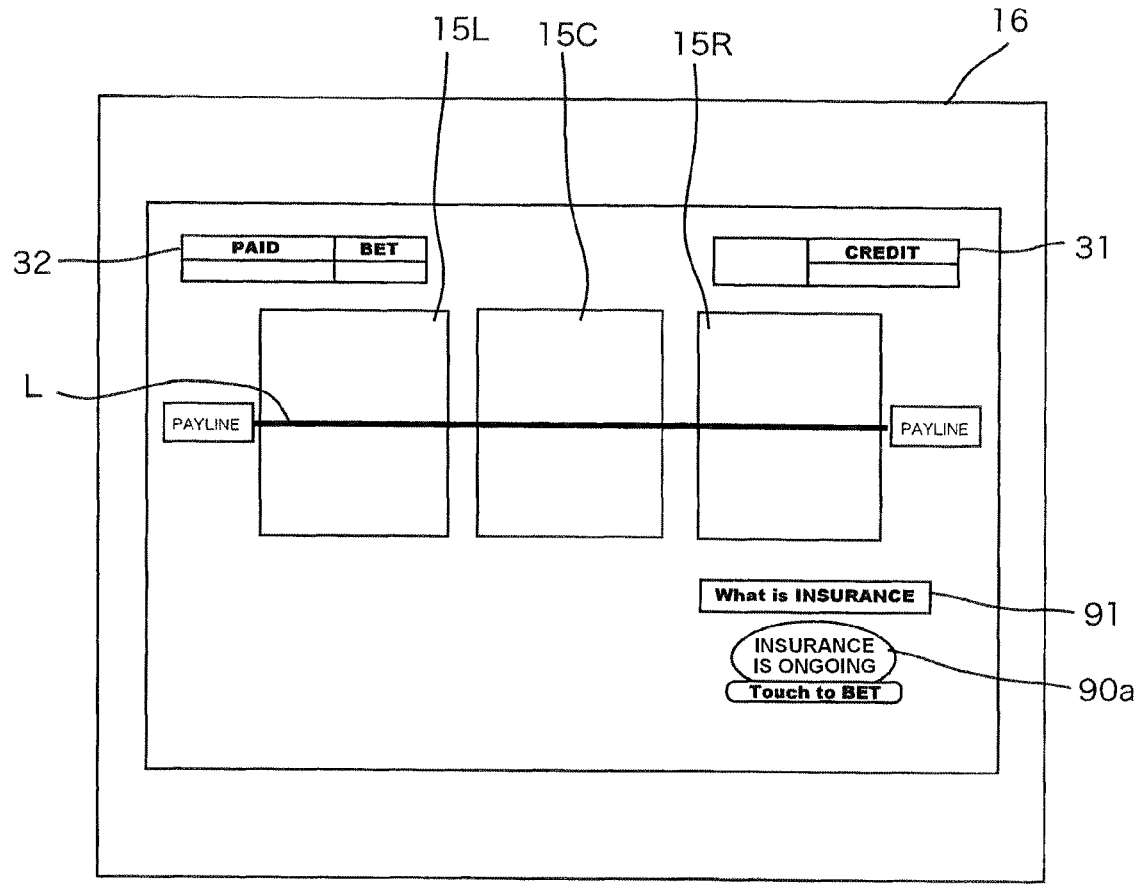

FIG.18

| CODE NO. | INDEX | NUMBER OF STEPS (*) |
|---|---|---|
| 00 | | 0 |
| 01 | | 18 |
| 02 | | 36 |
| 03 | | 54 |
| 04 | | 72 |
| 05 | | 91 |
| 06 | | 109 |
| 07 | | 127 |
| 08 | | 145 |
| 09 | | 163 |
| 10 | | 182 |
| 11 | | 200 |
| 12 | | 218 |
| 13 | | 236 |
| 14 | | 254 |
| 15 | | 273 |
| 16 | | 291 |
| 17 | | 309 |
| 18 | | 327 |
| 19 | | 345 |
| 20 | | 364 |
| 21 | | 382 |

*: NUMBER OF STEPS WHEN INDEX 1 IS DEFINED AS A REFERENCE

GAMING SYSTEM WITH COMMON DISPLAY AND CONTROL METHOD OF GAMING SYSTEM

CROSS-REFERENCE TO RELATED APPLICATIONS

This application claims priority of U.S. Provisional Application No. 61/037,885 filed on Mar. 19, 2008. The contents of this application are incorporated herein by reference in their entirety.

BACKGROUND OF THE INVENTION

1. Field of the Invention

The present invention relates to a gaming machine with a common display device and a control method thereof.

2. Description of the Related Art

Conventionally, in gaming facilities in which gaming machines such as slot machines are installed, players can enjoy games by inserting a variety of gaming mediums such as coins and cashes. Each of the gaming machines is designed so as to pay out a payment according to a winning prize (game outcome) that takes place in the progress of a game.

In a casino in which a plurality of slot machines are installed, there is a so called "jackpot" from which, after part of the credit consumed in each of the slot machines has been reserved, if the amount of the reservation reaches a predetermined amount of money, a large amount of payout is made such that a payment is not paid out to any of the slot machines in an ordinary hit (see Published US Patent Application No. 2003/073486, for example). In such slot machines, in the ordinary case, a hit takes place at each of the set probabilities, and players conduct games while anticipating the hit. By means of lottery other than that of the ordinary hit, which is based upon each of the probabilities set in the slot machines, a jackpot hit will take place on any of the slot machines with a predetermined timing.

The conventional gaming machines include those in which, if a gaming medium loss reaches a predetermined amount, a return is given to players who are performing games. The gaming machines having such a return function are characterized in that a countdown effect is rendered by a predetermined period that took until the return is performed. These machines are disclosed in U.S. Pat. Nos. 5,820,459 and 6,695,697, for example.

However, the countdown effect is rendered until the above-mentioned return is given, according to the number of times of executing games, etc., in individual gaming machines. This countdown effect is rendered irrespective of other gaming machines. In the conventional gaming machines, therefore, there is no possibility of raising the players' spirit of rivalry such as a spirit of competing against one another for the number of times of executing games. Further, these gaming machines entail a problem insofar that the players gradually lose their interest or concern relevant to the play of games while they perform the games for a long time.

The present invention has been made in view of the aforementioned circumstance. It is an object of the invention to provide a gaming system and a control method of the gaming system which arouses the players' spirit of rivalry and continues their interest or concern relevant to the play of games.

SUMMARY OF THE INVENTION

A first aspect of the present invention is directed to a gaming system, comprising: plurality of gaming machines; and a common display device connected to the gaming machines, each of the gaming machines, including: a display device for displaying a plurality of symbols; a controller, which performs processes of: (a) executing a base game in which symbols arranged on the display device are rearranged after a gaming medium has been betted, and thereafter, a payment is made in accordance with the rearranged symbols; (b) counting number of times of executing the base game; (c) causing the display device to display a countdown effect image stored in a memory, during a period from a time point at which the counted number of times of executing the base game reaches a first predetermined value to a time point at which it reaches a second predetermined value; and (d) transferring the base game to a free game executed without betting a gaming medium, in a case where the number of times of executing the base game reaches the second predetermined value; and a communication interface for notifying to the common display device the controller-counted number of times of executing the base game, the common display device, including: a communication interface for receiving notification from each of the gaming machines; a memory for storing a countdown effect image for each of the gaming machines; and a controller, which performs processes of: (a') judging whether or not there exist a plurality of gaming machines at which number of times of executing the base game reaches the first predetermined value, based upon the number of times of executing the base game, which is notified from each of the gaming machine; and (b') preferentially displaying the countdown effect image for a gaming machine with a smaller number of times of executing the base game, which is to be executed until a transfer to the free game, in a case where it is judged that there exist a plurality of gaming machines at which the number of times of executing the base game reaches the first predetermined value.

According to the abovementioned gaming system, in each of the gaming machines, a game (base game), in which a payment is made according to the rearranged symbols, is performed. Further, the number of times of executing the base game is counted, and a countdown effect is rendered during a period from a time point at which the counted number of times of executing the base game has reached a first predetermined value (for example, 990) to a time point at which it has reached a second predetermined value (for example, 1,000), i.e., during a period until a new game (free game) is started.

If the number of times of executing the base game has reached the second predetermined value, a game (free game) is started which the player is allowed to play even if no gaming mediums such as coins, bills, or electronic securities equivalent thereto are betted by the player. This game can be played even if no gaming mediums are betted by the player, and the objective thereof is to return gaming mediums to the player.

The number of times of executing the base game counted by each of the gaming machines is notified to the common display device. In the common display device, based upon the notification from each of the gaming machines, judgment is made as to whether or not there exist a plurality of gaming machines at which the countdown effect is started. If the plurality of game machines exist, the countdown effect of any of the gaming machines, with a small number of executing the base game, which is to be executed until a transfer to the free game, i.e., that any of the gaming machine with a smaller remaining number of countdowns, is preferentially rendered on the common display.

Therefore, even if a large number of gaming mediums are consumed while a game is performed over a long period, the game is performed until the game count reaches a specific number of times (the second predetermined value), whereby the game can be further performed even if no gaming mediums are betted (i.e., with no charge), and the player can obtain a benefit by this game. Accordingly, it is possible to prevent the players, who consumed a large number of gaming mediums, from raising discomfort or unreliability, or alternatively, losing their interest or concern relevant to the play of games.

If the game count is close to the specific number of times, the countdown effect is rendered in each of the gaming machines, thereby making it possible to attract the players' interest or concern relevant to the play of games. In the abovementioned system, further, if there exist a plurality of gaming machines at which the countdown effect is rendered, the countdown effect of a gaming machine at which the largest number of games are executed is preferentially rendered on the common display device, so that the player, who plays a game at that gaming machine, is allowed to have a sense of superiority over other players. Further, it is anticipated that the players compete against one another for the game count in order to have their sense of superiority. This can prompt each of the players to bet gaming mediums, making it possible to increase the profits of the game arcades in which the abovementioned gaming systems are installed.

A second aspect of the present invention is directed to the gaming system according to claim 1, wherein: the countdown effect image displayed on the display device of the gaming machine is analogous to the countdown effect image displayed on the common display device.

According to the abovementioned gaming system, the countdown effect rendered at a gaming machine at which the game count is close to a specific number of times (second predetermined value) is analogous to that rendered on the common display device.

Therefore, which player's countdown effect is rendered is clearly recognized by the surrounding spectators as well as players per se who are performing games, thus arousing the players' sense of competition more.

A third aspect of the present invention is directed to the gaming system, wherein: the controller of the common display device performs processes of: (a) judging whether or not transfer to the free game at a gaming machine is accomplished at which the countdown effect image is preferentially displayed on the common display device; and (b) changing a display image to a countdown effect image of another gaming machine, in a case where it is judged that the transfer to the free game is accomplished at the gaming machine.

According to the abovementioned gaming system, in the gaming machine in which the countdown effect is preferentially rendered on the common display device, if the game count has reached the specific number of times (second predetermined value), the countdown effect terminates at that gaming machine, so that the current effect is changed to the countdown effect of another gaming machine even on the common display device.

Therefore, if the countdown effect of a gaming machine with the smallest remaining counted number of countdowns terminates, the countdown effects of other players are rendered on the common display device, thus making it possible to prevent other players from losing their interest or concern relevant to the play of games.

A fourth aspect of the present invention is directed to the gaming system, wherein: the controller of the common display device performs processes of: (a) judging whether or not the number of times of executing the base game at a gaming machine at which the countdown effect image is preferentially displayed on the common display device is equal to the number of times of executing the base game at another gaming machine; and (b) simultaneously or alternately displaying the countdown effect images of both of the gaming machines, in a case where it is judged that the numbers of times of executing the base game at both of the gaming machines becomes equal to each other.

According to the abovementioned gaming system, if one gaming machine has the remaining counted number of countdowns which is equal to that of another one, the countdown effect images of both of the gaming machine are displayed simultaneously in a two-screen mode. Alternatively, these images are displayed alternately by making a time-based change, for example.

Therefore, it is possible to further enhance the spirit of rivalry among the players staying at the gaming machines with their remaining counted numbers of countdowns which are equal to each other. Further, the surrounding spectators can be aware of the fact that a competition starts among the players, and thus, the game arcade and its periphery are in great bustle and become active.

A fifth aspect of the present invention is directed to the gaming system, wherein: the controller of the common display device performs processes of: (a) judging whether or not the number of times of executing the base game at one game machine is greater than the number of times of executing the base game at another gaming machine, when the countdown effect images are displayed at both of the gaming machines; and (b) canceling display of the countdown effect image at said another gaming machine, in a case where it is judged that the number of times of executing the base game at said one gaming machine is greater than the number of times of executing the base game at said another gaming machine.

According to the abovementioned gaming machine, after the remaining counted numbers of countdowns are equal to each other between the two gaming machines, if the game count obtained at one gaming machine is more than that obtained at another one, the countdown effect of such another gaming machine is canceled on the common display device.

Therefore, the players strive to increase the game cont so that one's own countdown effect is not eliminated, and thus, are allowed to have rivalry more. Further, the surrounding spectators can be aware of the fact that a competition starts among the players, and thus, the game arcade and its periphery are in great bustle and become lively.

A sixth aspect of the present invention is directed to the gaming system, wherein: the controller of each of the gaming machines executes a process of starting notification of the number of times of executing the base game to the common display device, in a case where the counted number of times of the base game reaches a third predetermined value which is equal to or smaller than the first predetermined value.

According to the abovementioned gaming machine, the game count is notified to the common display immediately before the countdown effect is started at each of the gaming machines and subsequent.

Therefore, notification to the common display device does not always need to be provided every time the base game is executed at each of the gaming machines, and thus, it is possible to lowly restrain the communication amount between each of the gaming machines and the common display. Further, a burden between each of the gaming machines and the common display device can be alleviated by providing a period in which nothing is notified.

A seventh aspect of the present invention is directed to a gaming system, comprising a plurality of gaming machines; and a common display device connected to the gaming machines, each of the gaming machines, including: a display device for displaying a plurality of symbols; a controller, which performs processes of: (a) executing a base game in which symbols arranged on the display are rearranged after a gaming medium has been betted, and thereafter, a payment is made in accordance with the rearranged symbols; (b) counting number of times of executing the base game; (c) causing the display device to display a countdown effect image stored in a memory, during a period from a time point at which the counted number of times of executing the base game reaches a first predetermined value to a time point at which it reaches a second predetermined value; and (d) transferring the base game to a free game executed without betting a gaming medium, in a case where the number of times of executing the base game reaches the second predetermined value; and a communication interface for notifying to the common display the controller-counted number of times of executing the base game, the common display device, including: a communication interface for receiving notification from each of the gaming machines; a memory for storing a countdown effect image for each of the gaming machines; and a controller, which performs processes of: (a') judging whether or not there exist a plurality of gaming machines at which the number of times of executing the base game reaches the first predetermined value, based upon the number of times of executing the base game, which is notified from each of the gaming machines; (b') preferentially displaying the countdown effect image for a gaming machine with a smaller number of executing the base game, which is to be executed until a transfer to the free game, in a case where it is judged that there exist a plurality of gaming machines at which the number of times of executing the base game reaches the first predetermined value; (c') judging whether or not the number of times of executing the base game at a gaming machine at which the countdown effect image is preferentially displayed on the common display device is equal to the number of times of executing the base game at another game machine; (d') simultaneously or alternately displaying the countdown effect images of both of the gaming machines, in a case where it is judged that the numbers of times of executing the base game at both of the gaming machines becomes equal to each other; (e') judging whether or not the number of times of executing the base game at one gaming machine is greater than the number of times of executing the base game at another gaming machine, when the countdown effect images are displayed at both of the gaming machines; and (f') canceling display of the countdown effect image at said another gaming machine, in a case where it is judged that the number of times of executing the base game at said one gaming machine is greater than the number of times of executing the base game at said another gaming machine.

According to the abovementioned gaming system, in each of the gaming machines, a game (base game), in which a payment is made according to the rearranged symbols, is performed. Further, the number of times of executing the base game is counted, and a countdown effect is rendered during a period from a time point at which the counted number of times of executing the base game has reached a first predetermined value (for example, 990) to a time point at which it has reached a second predetermined value (for example, 1,000), i.e., during a period until a new game (free game) is started. If the number of times of executing the base game has reached the second predetermined value, a game (free game) is started which is executed even if no gaming mediums such as coins, bills, or electronic securities equivalent thereto are betted by the player. This game can be played even if no gaming mediums are betted by the player, and is intended to return gaming mediums to the player.

The number of times of executing the base game counted by each of the gaming machines is notified to the common display device. In the common display device, based upon the notification from each of the gaming machines, judgment is made as to whether or not there exist a plurality of gaming machines at which the countdown effect is started. If the plurality of game machines exist, the countdown effect of any of the gaming machines, with a small number of executing the base game, which is to be executed until a transfer to the free game, i.e., that of any of the gaming machines, with a smaller remaining number of countdowns, is preferentially rendered on the common display.

Further, in the gaming machine in which the countdown effect is preferentially rendered on the common display, if the game count has reached a specific number of times (second predetermined value), the countdown effect terminates at that gaming machine, and thus, the current effect is changed to the countdown effect of another gaming machine even on the common display device.

Therefore, even if a large number of gaming mediums are consumed while a game is performed over a long period, the game is performed until the game count reaches a specific number of times (the second predetermined value), whereby the game can be further performed even if no gaming mediums are betted (i.e., with no charge), and the player can obtain a benefit by this game. Accordingly, it is possible to prevent the players, who consumed a large number of gaming mediums, from raising discomfort or unreliability, or alternatively, losing an interest or concern relevant to the play of games.

If the game count is close to the specific number of times, the countdown effect is rendered in each of the gaming machines, thereby making it possible to attract the players' interest or concern relevant to the play of games. In the abovementioned system, further, if there exist a plurality of gaming machines at which the countdown effect is rendered, the countdown effect of any of the gaming machines, at which the largest number of games are executed, is preferentially rendered on the common display device, so that the player, who plays a game at that gaming machine, is allowed to have a sense of superiority over other players. Further, it is anticipated that the players compete against one another for the game count in order to have the sense of superiority. This can prompt each of the players to bet gaming mediums, making it possible to increase the profits of the game arcades in which the abovementioned gaming systems are installed.

Further, if the countdown effect of a gaming machine with the smallest remaining counted number of countdowns terminates, the countdown effects of other players' gaming machines are rendered on the common display device, thus making it possible to prevent other players from losing the players' interest or concern relevant to the play of games.

An eighth aspect of the present invention is directed to a gaming system, comprising: a plurality of gaming machines; and a common display device connected to the gaming machines, each of the gaming machines, including: a display device for displaying a plurality of symbols; a controller, which performs processes of: (a) executing a base game in which symbols arranged on the display are rearranged after a gaming medium has been betted, and thereafter, a payment is made in accordance with the rearranged symbols; (b) counting number of times of executing the base game; (c) causing the display device to display a countdown effect image stored in a memory, during a period from a time point at which the counted number of times of executing the base game reaches a first predetermined value to a time point at which it reaches a second predetermined value; and (d) transferring the base game to a free game executed without betting a gaming medium, in a case where the number of times of executing the base game reaches the second predetermined value; and a communication interface for notifying to the common display the controller-counted number of times of executing the base game, the common display device, including: a communication interface for receiving notification from each of the gaming machines; a memory for storing a countdown effect image for each of the gaming machines; and a controller, which performs processes of: (a') judging whether or not there exist a plurality of gaming machines at which the number of times of executing the base game reaches the first predetermined value, based upon the number of times of executing the base game, which is notified from each of the gaming machines; (b') preferentially displaying the countdown effect image for a gaming machine with a smaller number of executing the base game, which is to be executed until a transfer to the free game, in a case where it is judged that there exist a plurality of gaming machines at which the number of times of executing the base game reaches the first predetermined value; (c') judging whether or not the number of times of executing the base game at a gaming machine at which the countdown effect image is preferentially displayed on the common display device is equal to the number of times of executing the base game at another game machine; (d') simultaneously or alternately displaying the countdown effect images of both of the gaming machines, in a case where it is judged that the numbers of times of executing the base game at both of the gaming machines becomes equal to each other; (e') judging whether or not the number of times of executing the base game at one gaming machine is greater than the number of times of executing the base game at another gaming machine, when the countdown effect images are displayed at both of the gaming machines; and (f') canceling display of the countdown effect image at said another gaming machine, in a case where it is judged that the number of times of executing the base game at said one gaming machine is greater than the number of times of executing the base game at said another gaming machine.

According to the abovementioned gaming system, in each of the gaming machines, a game (base game), in which a payment is made according to the rearranged symbols, is performed. Further, the number of times of executing the base game is counted, and a countdown effect is rendered during a period from a time point at which the counted number of times of executing the base game has reached a first predetermined value (for example, 990) to a time point at which it has reached a second predetermined value (for example, 1,000), i.e., during a period until a new game (free game) is started. If the number of times of executing the base game has reached the second predetermined value, a game (free game) can be started which the player is allowed to play even if no gaming mediums such as coins, bills, or electronic securities equivalent thereto are betted by the player. This game can be played even if no gaming mediums are betted by the player, and is intended to return gaming mediums to the player.

The number of times of executing the base game counted by each of the gaming machines is notified to the common display device. In the common display device, based upon the notification from each of the gaming machines, judgment is made as to whether or not there exist a plurality of gaming machines at which the countdown effect is started. If the plurality of game machines exist, the countdown effect of any of the gaming machines, with a small number of executing the base game, which is to be executed until a transfer to the free game, i.e., that of any of the gaming machines, with a smaller remaining number of countdowns, is preferentially rendered on the common display.

If one gaming machine has the remaining counted number of countdowns which is equal to that of another one, the countdown effect images of both of the gaming machine are displayed simultaneously in a two-screen window. Alternatively, these images are displayed alternately by making a time-based change, for example. Further, after the counted remaining numbers of countdowns are equal to each other in these two gaming machines, if the game count at one of the game machines is greater than that of the other one, the countdown effect of such another gaming machine is canceled on the common display device.

Therefore, even if a large number of gaming mediums are consumed while a game is performed over a long period, the game is performed until the game count reaches a specific number of times (the second predetermined value), whereby the game can be performed even if no gaming mediums are betted (i.e., with no charge), and the player can obtain a benefit by this game. Accordingly, it is possible to prevent the players, who consumed a large number of gaming mediums, from raising discomfort or unreliability, or alternatively, losing their interest or concern relevant to the play of games.

If the game count is close to the specific number of times, the countdown effect is rendered in each of the gaming machines, thereby making it possible to attract the players' interest or concern relevant to the play of games. In the abovementioned system, further, if there exist a plurality of gaming machines at which the countdown effect is rendered, the countdown effect of a gaming machine at which the largest number of games are executed is preferentially rendered on the common display device, so that the player, who plays a game at that gaming machine, is allowed to have a sense of superiority over other players. Further, it is anticipated that the players compete against each other for the game count in order to have the sense of superiority. This can prompt each of the players to bet gaming mediums, making it possible to increase the profits of the game arcades in which the abovementioned gaming systems are installed.

The rivalry between the players, each of which has the remaining counted number of countdowns equal to that of another, can be enhanced. The players strive to increase the game count so that one's own countdown effect is not eliminated, and thus, are allowed to have rivalry more. Further, the surrounding spectators can be aware of the fact that a competition starts between the players, and thus, the game arcade and its periphery are in great bustle and become lively.

A ninth aspect of the present invention is directed to a gaming system, comprising: a plurality of gaming machines; and a common display device connected to the gaming machines, each of the gaming machines, including: a display device for displaying a plurality of symbols; a controller, which performs processes of: (a) executing a base game in which symbols arranged on the display are rearranged after a gaming medium has been betted, and thereafter, a payment is made in accordance with the rearranged symbols; (b) counting number of times of executing the base game; (c) causing the display device to display a countdown effect image stored in a memory, during a period from a time point at which the counted number of times of executing the base game reaches a first predetermined value to a time point at which it reaches a second predetermined value; and (d) transferring the base game to a free game executed without betting a gaming medium, in a case where the number of times of executing the base game reaches the second predetermined value; and a communication interface for starting notification to the common display the controller-counted number of times of executing the base game, in a case where the number of times of executing the base game reaches a third predetermined value smaller than the first predetermined value, the common display device, including: a communication interface for receiving notification from each of the gaming machines; a memory for storing a countdown effect image for each of the gaming machines; and a controller, which performs processes of: (a') judging whether or not there exist a plurality of gaming machines at which the number of times of executing the base game reaches the first predetermined value, based upon the number of times of executing the base game, which is notified from each of the gaming machines; and (b') preferentially displaying the countdown effect image for a gaming machine with a smaller number of times of executing the base game, which is to be executed until a transfer to the free game, in a case where it is judged that there exist a plurality of gaming machines at which the number of times of executing the base game reaches the first predetermined value.

According to the abovementioned gaming system, in each of the gaming machines, a game (base game), in which a payment is made according to the rearranged symbols, is performed. Further, the number of times of executing the base game is counted, and a countdown effect is rendered during a period from a time point at which the counted number of times of executing the base game has reached a first predetermined value (for example, 990) to a time point at which it has reached a second predetermined value (for example, 1,000), i.e., during a period until a new game (free game) is started. If the number of times of executing the base game has reached the second predetermined value, a game (free game) can be started which the player is allowed to play even if no gaming mediums such as coins, bills, or electronic securities equivalent thereto are betted by the player. This game can be played even if no gaming mediums are betted by the player, and the objective thereof is to return gaming mediums to the player.

The number of times of executing the base game counted by each of the gaming machines is notified to the common display device. In the common display device, based upon the notification from each of the gaming machines, judgment is made as to whether or not there exist a plurality of gaming machines at which the countdown effect is started. If the plurality of game machines exist, the countdown effect of any of the gaming machines, with a small number of executing the base game, which is to be executed until a transfer to the free game, i.e., that of any of the gaming machines, with a smaller remaining number of countdowns, is preferentially rendered on the common display.

Therefore, even if a large number of gaming mediums are consumed while a game is performed over a long period, the game is performed until the game count reaches a specific number of times (the second predetermined value), whereby the game can be performed even if no gaming mediums are betted (i.e., with no charge), and the player can obtain a benefit by this game. Accordingly, it is possible to prevent the players, who consumed a large number of gaming mediums, from raising discomfort or unreliability or losing an interest or concern relevant to the play of games.

If the game count is close to the specific number of times, the countdown effect is rendered in each of the gaming machines, thereby making it possible to attract the players' interest or concern relevant to the play of games. In the abovementioned system, further, if there exist a plurality of gaming machines at which the countdown effect is rendered, the countdown effect of any of the gaming machines, at which the largest number of games are executed, is preferentially rendered on the common display device, so that the player, who plays a game at that gaming machine, is allowed to have a sense of superiority over other players. Further, it is anticipated that the players compete the game count against each other in order to have the sense of superiority. This can prompt each of the players to bet gaming mediums, making it possible to increase the profits of the game arcades in which the abovementioned gaming systems are installed.

Further, it is not always necessary perform notification to the common display device every time the base game is executed at each of the gaming machines, and thus, it becomes possible to lowly restrain the communication amount between each of the gaming machines and the common display. Further, a burden between each of the gaming machines and the common display device can be alleviated by providing a period in which nothing is notified.

A tenth aspect of the present invention is directed to a control method of displaying effect images by a plurality of gaming machines, each of which comprises a display device, and a common display device connected to the gaming machines, said method executing the steps of: at each of the gaming machines, (a) executing a base game in which symbols arranged on the display device are rearranged after a gaming medium has been betted, and thereafter, a payment is made in accordance with the rearranged symbols; (b) counting number of times of executing the base game; (c) causing the display device to display the countdown effect image stored in a memory, during a period from a time point at which the counted number of times of executing the base game reaches a first predetermined value to a time point at which it reaches a second predetermined value; (d) transferring the base game to a free game executed without betting a gaming medium, in a case where the number of times of executing the base game reaches the second predetermined value; and (e) notifying the counted number of times of executing the base game to the common display device; and executing the steps of: on the common display, (a') judging whether or not there exist a plurality of gaming machines at which the number of times of executing the base game reaches the first predetermined value, based upon the number of times of executing the base game, which is notified from each of the gaming machines; and (b') preferentially displaying the countdown effect image for a gaming machine with a smaller number of times of executing the base game, which is to be executed until a transfer to the free game, in a case where it is judged that there exist a plurality of gaming machines at which the number of times of executing the base game reaches the first predetermined value.

According to the abovementioned control method, in each of the gaming machines, a game (base game), in which a payment is made according to the rearranged symbols, is performed. Further, the number of times of executing the base game is counted, and a countdown effect is rendered during a period from a time point at which the counted number of times of executing the base game has reached a first predetermined value (for example, 990) to a time point at which it has reached a second predetermined value (for example, 1,000), i.e., during a period until a new game (free game) is started. If the number of times of executing the base game has reached the second predetermined value, a game (free game) can be started which the player is allowed to play even if no gaming mediums such as coins, bills, or electronic securities equivalent thereto are betted by the player. This game can be played even if no gaming mediums are betted by the player, and the objective thereof is to return gaming mediums to the player.

The number of times of executing the base game counted by each of the gaming machines is notified to the common display device. In the common display device, based upon the notification from each of the gaming machines, judgment is made as to whether or not there exist a plurality of gaming machines at which the countdown effect is started. If the plurality of game machines exist, the countdown effect of any of the gaming machines, with a small number of executing the base game, which is to be executed until a transfer to the free game, i.e., that of any of the gaming machines, with a smaller remaining number of countdowns, is preferentially rendered on the common display.

Therefore, even if a large number of gaming mediums are consumed while a game is performed over a long period, the game is performed until the game count reaches a specific number of times (the second predetermined value), whereby the game can be performed even if no gaming mediums are betted (i.e., with no charge), and the player can obtain a benefit by this game. Accordingly, it is possible to prevent the players, who consumed a large number of gaming mediums, from raising discomfort or unreliability or losing an interest or concern relevant to the play of games.

If the game count is close to the specific number of times, the countdown effect is rendered in each of the gaming machines, thereby making it possible to attract the players' interest or concern relevant to the play of games. In the abovementioned system, further, if there exist a plurality of gaming machines at which the countdown effect is rendered, the countdown effect of a gaming machine at which the largest number of games are executed is preferentially rendered on the common display device, so that the player, who plays a game at that gaming machine, is allowed to have a sense of superiority over other players. Further, it is anticipated that the players compete against one another for the game count in order to have the sense of superiority. This can prompt each of the players to bet gaming mediums, making it possible to increase the profits of the game arcades in which the abovementioned gaming systems are installed.

BRIEF DESCRIPTION OF THE DRAWINGS

FIG. 3 is a view for explaining a payout table in the embodiment;

FIG. 8 is a schematic view showing an exemplary display in a case in which the plurality of countdown images is alternately displayed on the common display device;

FIG. 11 is a view showing exemplary images displayed on the upper and lower image display panels in the insurance-off mode;

FIG. 12 is a view showing exemplary images displayed on the upper and lower image display panels during an insurance-on mode;

FIG. 18 is a schematic view showing a correlation table between step Nos. and code Nos.

DESCRIPTION OF THE PREFERRED EMBODIMENTS

Figure 1:
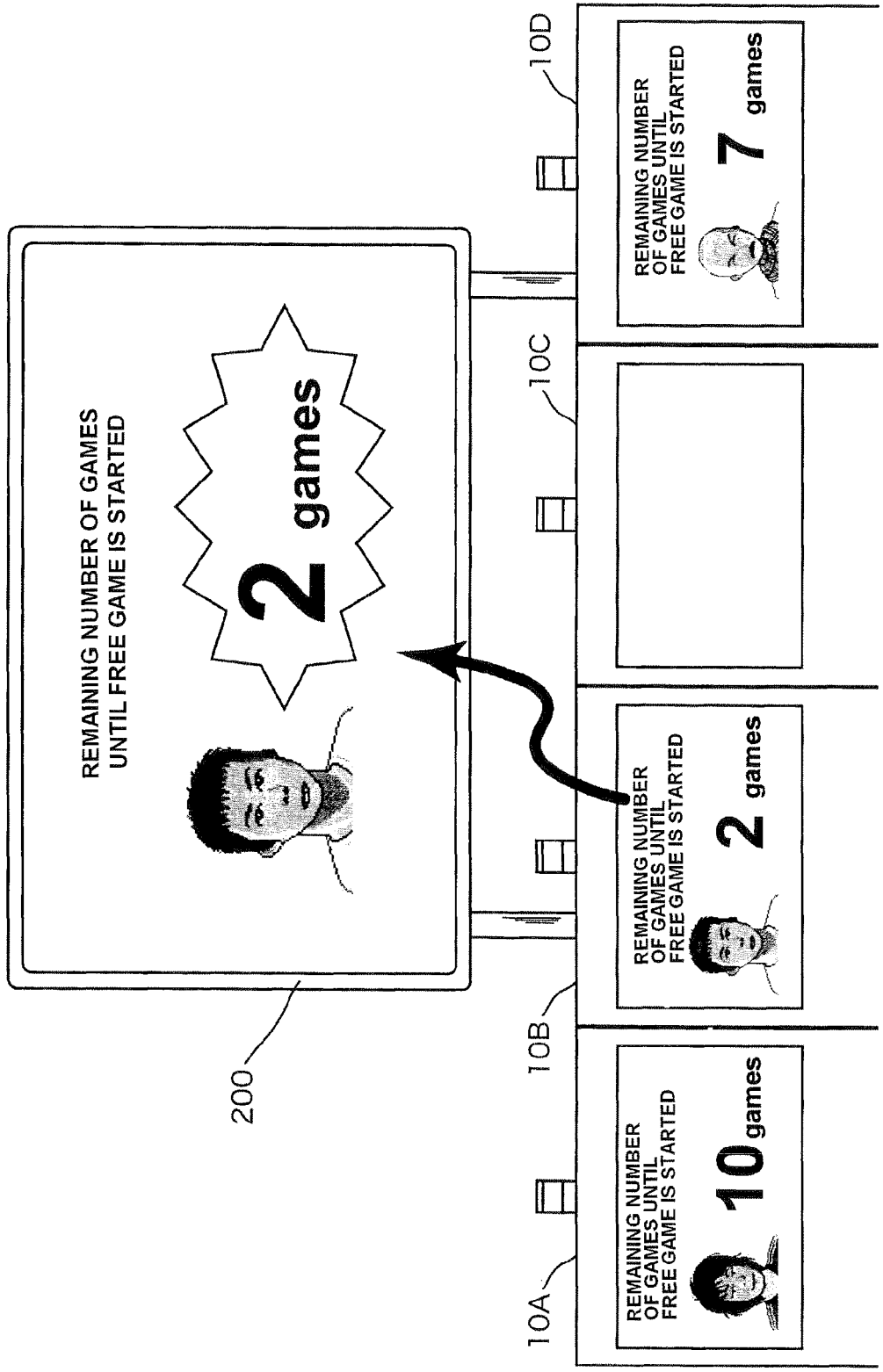
FIG. 1 is an explanatory view of processing operations of a gaming system according to the embodiment.

Hereinafter, embodiments of the present invention will be described in detail with referring to the drawings. FIG. 1 is an explanatory view of processing operations of a gaming system according to the embodiment. A gaming system 1 according to the embodiment is provided with: four gaming machines 10A to 10D; and a common display device 200, which is connected thereto. These four gaming machines 10A to 10D are integrally concatenated with each other, and the common display device 200 is supported by a column provided at the rear side of the gaming machines 10A to 10D. Such gaming system 1, which is capable of performing a variety of games, may be constructed in one gaming facility such as bar parlor or casino, or alternatively, may be constructed among a plurality of gaming facilities. The gaming system 1 may be constructed in one gaming facility on a floor-by-floor basis or on a section-by-section basis in the gaming facility. Hereinafter, the gaming machines 10A to 10D are simply referred to as gaming machines 10 as long as there is no need to discriminate them from one another.

In the present embodiment, the gaming machines 10 are equivalent to slot machines. In the invention, however, the gaming machines may be so called single gaming machines such as video slot machines or video card games, for example, without being limitative to the slot machines. Alternatively, they are so called mass-entertainment-type gaming machines (multi-terminal gaming machines) which perform games such as a horserace game, a bingo game, and lottery, for example, requiring a predetermined time until the game outcomes are displayed.

In the gaming machine 10, coins, bills, or electronic valuable information are employed as gaming mediums. In the present invention, however, medals, tokens, electronic money, or tickets, for example, may be employed as gaming mediums without being limitative thereto in particular. As the abovementioned tickets, for example, bar code-attached tickets, as described later, may be employed without being limitative thereto in particular.

The common display device 200 serves as a display device for presenting information to be shared among the players who are playing games at the gaming machines 10 or displaying the contents of games, which are executed at the gaming machines, or the effect images. The present embodiment assumes that four gaming machines 10 are connected to one common display device 200. A plurality of gaming machines 10 may be connected to one common display device 200 without being limitative thereto.

To the gaming machines 10, specific ID numbers (i.e., identification information for identifying the gaming machines 10) thereof are assigned, and the common display device 200 discriminates sources of data which is sent from each of the gaming machines 10. The data transmitted by the gaming machines 10 to the common display device 200 include the number of times of executing base games described later. Even in the case of transmitting data from the common display device 200 to the gaming machines 10, a transmission destination is specified using ID numbers. The identification information of the gaming machines may include characters, signs, numerals, and combinations thereof, for example, without being limitative thereto.

In the gaming machines 10, a game is performed in which, gaming mediums of which the number is not greater than a maximum predetermined BET number are betted, and thereafter, a plurality of symbols are variably displayed on reels (see FIG. 2) serving as symbol display devices. Further, the variably displayed symbols are displayed in a stopped state, and the amount of payment is determined according to the symbols displayed in a stopped state or a combination of the displayed symbols (hereinafter, referred to as a base game which is generally performed in a slot machine or the like).

Moreover, an insurance-off mode is transferred to an insurance-on mode on condition that a predetermined number (1, in the embodiment) of gaming mediums has been entered. If the number of times of executing all of the base games performed after transfer to the insurance-on mode (hereinafter, referred to as total game count C) reaches a predetermined number (second predetermined value Th2, for example, 1,000 times), a predetermined number of gaming media (360 in the embodiment) is paid, and a free game is performed.

The free game is performed even if no gaming mediums are betted. In this game, a plurality of symbols is variably displayed on reels 14, and thereafter, the variably displayed symbols are displayed in a stopped state. Further, the amount of payment is determined according to the symbols displayed in a stopped state or a combination of the displayed symbols. In other words, the free games, the contents of which are identical to those of base games, are performed even if no gaming medium is betted. The free games may be performed by a predetermined number of times (for example, 1000 times), or alternatively, may be varied according to the game history of the base game.

The gaming system 1 according to the embodiment renders countdown effects on both of the gaming machines 10 and the common display device 200 until the free game is started, in order to enhance anticipation or excitement of the players relative to the free games. This countdown effect is rendered if the number of times of executing base games reaches a specific number of times (a first predetermined value Th1, for example, 990 times).

Specifically, if the countdown effect is rendered in the gaming machines 10, a countdown effect-destined image (or video image) is displayed on a display device (upper image display panel 33) provided at each of the gaming machines 10. It is desirable that these countdown effect-destined images be different from each other depending upon the gaming machines 10.

The gaming machines 10 are designed to notify the number of times of executing base games to the common display device 200. On the common display device 200, a countdown effect is rendered based upon the number of times of executing base games notified from the gaming machines 10. Among the four gaming machines 10 connected to the common display device 200, if the countdown effect is started at only one thereof, the common display device 200 also displays images which are analogous to the countdown effect-destined images displayed on the gaming machines 10. Among the four gaming machines connected to the common display device 200, further, if the countdown effects are rendered by the plurality thereof, they are rendered on the common display device, with respect to the gaming machines 10 with the fewest base games (hereinafter, referred to as a remaining game count) that must be completed until a free game.

As shown in FIG. 1, assuming that: a remaining base game count for a free game is 10 times on the left-most gaming machine 10A; it is 2 times on the second left gaming machine 10B; it is 11 times or more on the third left gaming machine 10C (in other words, no countdown effect is rendered); and it is 7 times on the fourth-left gaming machine 10D, the fewest base games remains on the second-left gaming machine 10B. Thus, the countdown effect is rendered with respect to this gaming machine 10B. At this time, the countdown effect image, which is analogous to that displayed on the display device of the gaming machine 10B, is displayed on the common display device 200. In other words, the countdown effect image displayed on the display device of the gaming machine 10B is made analogous to that displayed on the common display device 200, so that the players or their surrounding spectators who are not playing games can clearly recognize that the countdown effect is rendered as to the gaming machine 10B. In the example shown in FIG. 1, a character image employed for countdown effect is commonly used between the gaming machine 10B and the common display device, whereby the abovementioned countdown effect images are analogous thereto.

A technique of displaying an analogous countdown effect image is not limitative to a technique employing the common character, as described above. For example, while a background color, a background image, and a character font or the like used for a countdown effect image are set for each of the gaming machines 10, when the countdown effect is rendered on the common display device 200, those for specific gaming machines may be selectively displayed.

Figure 2:
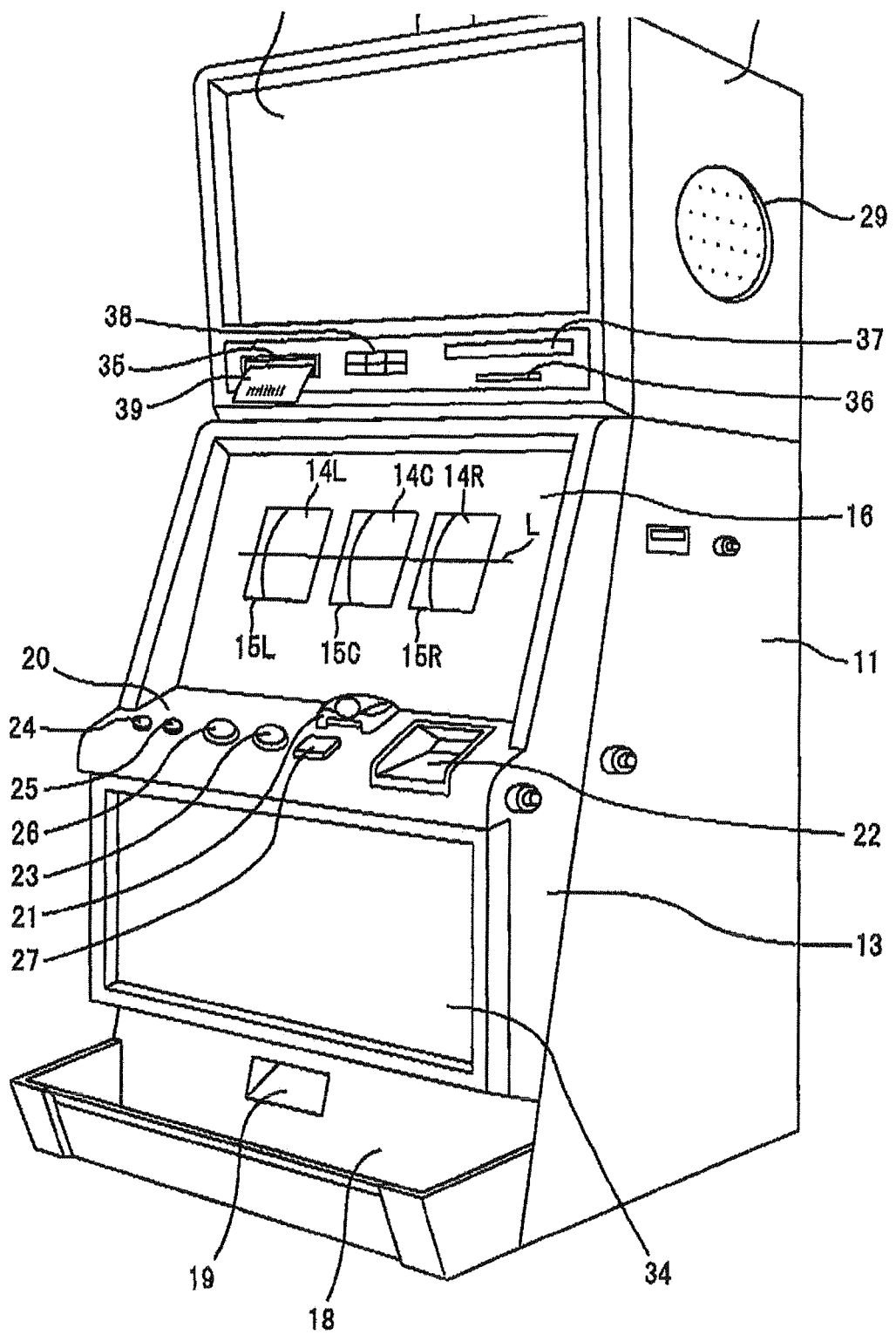
FIG. 2 is a perspective view schematically depicting a gaming machine.

FIG. 2 is a perspective view schematically depicting one of the gaming machines 10. Each of the gaming machines 10 is provided with: a cabinet 11; a top box 12, which is installed at the upper side of the cabinet 11; and a main door 13, which is provided on the front face of the cabinet 11. Three reels 14 (14L, 14C, 14R) are rotatably provided inside of the cabinet 11. A symbol column consisting of 22 patterns (hereinafter, referred to as "symbols") is drawn on the outer circumference of each of the reels 14.

A lower image display pane 16 is provided in front of each of the reels 14 at a main door 13. The lower image display panel 16 is provided with a transparent liquid crystal display panel on which a variety of images or effect images, etc., pertinent to games are displayed during the play of the games. A credit amount display section 31 and a payout number display section 32 are set on the lower image display panel 16. The credit amount display section 31 displays the number of credited coins by way of image. The payout number display section 32 displays, by way of image, the number of coins to be paid out if a predetermined combination of symbols is displayed in a stopped state on a payline L.

On the lower image display panel 16, three display windows 15 (15L, 15C, 15R), which are capable of visually recognizing a rear face of the display panel, are formed, and the symbols drawn on the outer periphery of the reels 14 via the display windows 15 are displayed on a three-by-three symbols basis. On the lower image display panel 16, one payline horizontally crossing the three display windows 15 is formed. The payline L defines a combination of symbols. If a predetermined combination of symbols is displayed in a stopped state on the payline L, coins are paid out, the number of which corresponds to the predetermined combination and the number of inserted coins (BET number).

In the present invention, for example, where a plurality of paylines L horizontally or obliquely crossing the three display windows 15, for example, is formed, the paylines L are activated, the number of which corresponds to that of inserted coins, and then, a predetermined combination of symbols are displayed in a stopped state, coins of which the number corresponds to the predetermined combination may be paid out.

Further, on a front face of the lower image display panel 16, a touch panel 69 is provided, although not shown, so that a player can enter various instructions (pertinent to an insurance-on mode, for example) by operating the touch panel 69.

Downwardly of the lower image display panel 16, a control panel 20 consisting of a plurality of buttons 23 to 27 for entering instructions pertinent to the progress of a game by a player; a coin insertion slot 21 for accepting coins in the cabinet 11; and a bill validator 22 are provided.

On the control panel 20, a SPIN button 23, a CHANGE button 24, a CASHOUT button 25, a 1-BET button 26, and a MAX-BET button 27 are provided. The SPIN button 23 is intended to enter an instruction for starting rotation of the reels 14. The CHANGE button 24 is employed upon a player asking an attendant in gaming facility for money changing. The CASHOUT button 25 is intended to enter an instruction for paying out credited coins to the coin tray 18.

The 1-BET button 26 is intended to enter an instruction for betting one of the credited coins on a game. The MAX-BET button 27 is intended to enter an instruction for betting the maximum number of credited coins (50 coins in the embodiment) that can be betted on one game.

In the present invention, insertion of gaming mediums denotes that gaming mediums are consumed. The gaming mediums are consumed where they are betted on a game and where they are consumed to migrate to an insurance-on mode described later. For example, if the coins inserted into the coin insertion slot 21 are directly betted on a game, the coin insertion into the coin insertion slot 21 is equivalent to gaming medium insertion. As in the present invention, however, if coins are temporarily credited after being inserted into the coin insertion slot 21 and if the credited coins are betted by operating the 1-BET button 26 or the MAX-BET button 27, such betting is equivalent to gaming medium insertion.

The bill validator 22 validates whether or not bills are legitimate and accepts the legitimate bills in the cabinet 11. The bill validator 22 may be constituted so that the bar code-attached ticket 39 described later can be read. On the lower front face of the main door 13, i.e., downwardly of the control panel 20, a belly glass 34, on which characters or the like of the gaming machine 10 are drawn, is provided.

On the front face of the top box 12, an upper image display panel 33 is provided. The upper image display panel 33 is provided with a liquid crystal panel, and, for example, images are displayed which is indicative of an introduction to effect images or the contents of games and an explanation of the rules of the games.

On the top box 12, a speaker 29 is provided. At the lower side of the upper image display panel 33, a ticket printer 35, a card reader 36, a data display 37, and a keypad 38 are provided. The ticket printer 35 prints, on tickets, bar codes containing coded data such as credit amount, date and time, or ID numbers of the gaming machine, and the bar code-attached tickets 39 are output. Players can exchange the bar code-attached tickets 39 with bills of the like at predetermined sites of gaming facilities (for example, cashier in casino).

The card reader 36 reads and writes data from and to a smart card. The smart card is owned by a player, and stores data for identifying a player or data pertinent to a history of games performed by players, for example. The smart card may store data equivalent to coins, bills, or credits. In place of the smart card, further, a magnetic stripe card may be employed. The data display 37 is made up of a fluorescent display or the like, and displays data read by the card reader 36 or data input by a player via the keypad 38, for example. The keypad 38 is intended for entering the instructions or data pertinent to the issuance of tickets.

FIG. 3 is a view for explaining a payout table in the embodiment. "DOUBLE", "3BAR", "2BAR", "1BAR", and "CHERRY" contained in the payout table denote types of symbols drawn on each of the reels 14. On each of the reels 14, apart from the above symbols, a bonus trigger serving as a symbol corresponding to "GIFT BONUS" or any other symbol is also drawn. "ANY BAR" contained in the payout table indicates "3BAR", "2BAR", or "1BAR", and "ANY" denotes any symbol.

Combinations of the symbols shown in the payout table denote winning combinations, and the payout number of coins according to a BET number is set for each of the combinations. If a combination of the symbols displayed in a stopped state on each of the reels 14 is that of the bonus triggers of "GIFT BONUS", a predetermined number of coins are paid out as a jackpot. The numerical values corresponding to "GIFT BONUS" described on the payout table denote expectation values of the coin payout numbers, and are uniform irrespective of the BET numbers. If the number of bets is 1 BET, therefore, settings are provided such that a probability of "GIFT BONUS" is low and a large number of coins are paid out. This probability is set according to symbol-weighted data.

Four different types of jackpots "GRAND", "MAJOR", "MINOR", and "MINI" are provided in sequential order from the largest payout number of coins. The lower probabilities of occurrence of these jackpots are set, as the larger the payout number of coins is, and which one of the jackpots is established is randomly determined using random number values. The expectation values of the coin payout numbers in the jackpots are uniform.

After the 1-BET button 26 or the MAX-BET button 27 has been depressed, when a SPIN button 23 is depressed to start a game, the columns of the symbols drawn on each of the reels 14 are displayed in a scrolled-down manner, together with rotation of each of the reels 14. After elapse of a predetermined time, these columns of the symbols are displayed in a stopped state on the display window 15, together with rotation stop of each of the reels 14. Further, if a variety of winning combinations is predetermined based upon combinations of the symbols, and then, a combination of the symbols corresponding to one of these winning combinations is stopped on a payline L, the payout number of coins corresponding to the winning combination is added to the player-owned credit. When a combination of "GIFT BONUS" bonus triggers is realized, a predetermined payout number is added to the player-owned credit.

The present embodiment describes a case in which a jackpot-based coin payout is made when a combination of bonus triggers is realized. In the present invention, however, a game-playing state, which is established when the combination of the bonus triggers is realized, is not limitative in particular, and games such as a second game and a mystery bonus game can be performed, for example. When the bonus trigger combination is realized, a bar code-attached ticket 39 on which the predetermined information was printed may be issued.

In the payout table, combinations of the symbols indicated by italics are those in which 180 or more coins are paid out when they are realized in a game performed by MAX-BET. In the game performed by MAX-BET in an insurance-on mode, if any one of these symbol combinations is realized, the insurance-on mode migrates to the insurance-off mode.

Figure 4:
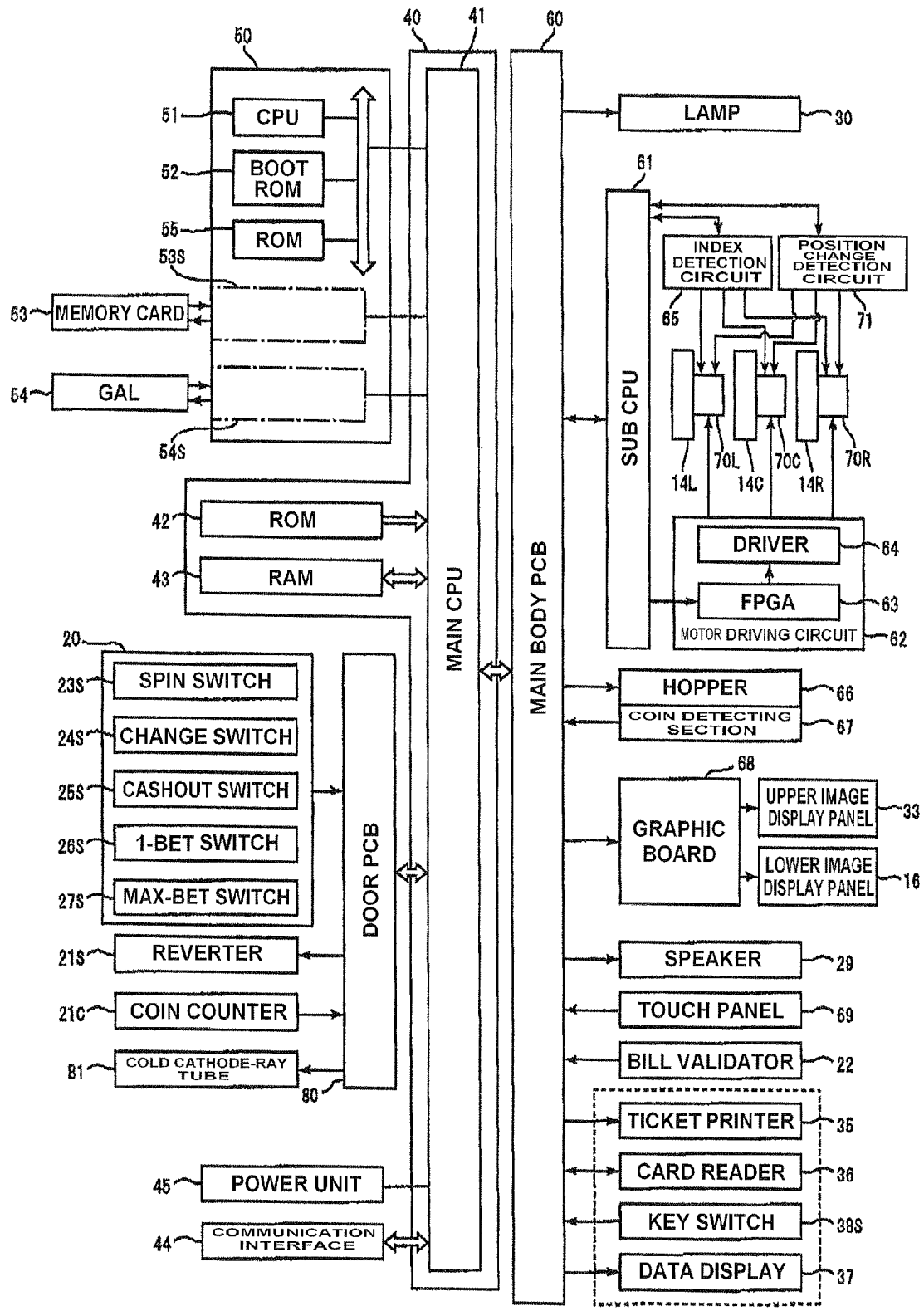
FIG. 4 is a block diagram depicting an internal configuration of the gaming machine.

FIG. 4 is a block diagram depicting an internal configuration of a gaming machine 10. A gaming board 50 is provided with: a CPU (Central Processing Unit) 51, which is interconnected to the gaming board via an internal bus; a ROM 55 and a boot ROM 52; a card slot 53S corresponding to a memory card 53; and an IC socket 54S corresponding to a GAL (Generic Array Logic) 54.

The memory card 53 is made up of a nonvolatile memory such as Compact Flash (registered trademark), and stores game programs and game system programs. The game programs include a stopped-symbol determination program. The stopped-symbol determination program is intended to determine symbols of each of the reels 14, which are displayed in a stopped state on the payline L (code No. corresponding to symbols). The above stopped-symbol determination program includes symbol-weighted data corresponding to each of a plurality of payout rates (80%, 84%, 88%, for example). The symbol-weighted data is indicative of a correspondence between code Nos. of symbols (see FIG. 3) and one or a plurality of random number values belonging to a predetermined numeric range (0 to 256). The payout rates are determined based upon the payout rate setting data that is output from the GAL 54, and lottery is performed based upon the symbol-weighted data corresponding to the payout rates.

In addition, a card slot 53S is constituted to enable removable insertion of the memory card 53, and the card slot is connected to a motherboard 40 by means of an IDE bus. Therefore, the memory card 53 is removed from the card slot 53S, other game programs and game system programs are written into the memory card 53, and thereafter, the memory card 53 is inserted into the card slot 53S, thereby making it possible to vary the kinds or contents of the games performed at the gaming machine 10. Further, the memory card 53 storing one group of game programs and game system programs is replaced with that storing another group of game programs and game system programs, thereby making it possible to vary the kinds or contents of the games performed at the gaming machine 10. The game programs include those which are relevant to the operating procedures for performing games. Further, they also include image data or sound data output during the play of a game and image data or sound data for notifying a transfer to the insurance-on mode.

The GAL 54 is a kind of PLD having an OR-fixed arrayed structure. The GAL 54 is provided with pluralities of IN ports and OUT ports. If predetermined items of data are input to the IN port, the corresponding data is output from the OUT port. The data output from the OUT port is equivalent to the above-described payout rate setting data. Further, the IC socket 54S is constituted so as to enable removable insertion of the GAL 54, and is connected to the motherboard 40 by means of a PCI bus. Therefore, the GAL 54 is removed from the IC socket 54S, and thereafter, the GAL 54 is mounted to the IC socket 54S, thereby making it possible to vary the payout rate setting data output from the GAL 54. Further, the GAL 54 is replaced with the replacement GAL 54, thereby making it possible to vary the payout rate setting data.

The CPU 51, ROM 55, and boot ROM 52 interconnected by an internal bus is connected to the motherboard 40 by means of the PCI bus. The PCI bus transmits a signal between the motherboard 40 and the gaming board 50, and supplies power from the motherboard 40 to the gaming board 50. The ROM 50 stores country ID information and an authentication program. The boot ROM 52 stores a preliminary authentication program and a program (boot code) or the like for the CPU 51 to boot the preliminary authentication program.

The authentication program is a program (falsification check program) for authenticating game programs and game system programs. The authentication program is described along verification and certification of the fact that the game programs and game system programs targeted for authentication capturing processing are not falsified, i.e., along the procedures for authenticating the game programs and game system programs (authentication procedures). The preliminary authentication program is intended to authenticate the authentication program described above. The preliminary authentication program is described along certification of the fact that the authentication program targeted for authentication processing is not falsified, i.e., along the procedures for authenticating the authentication program (authentication procedures).

The motherboard 40 is constituted using a commercially available motherboard (printed wiring board mounting basic parts of a personal computer), and is provided with: a main CPU 41; a ROM (Read Only Memory) 42; a RAM (Random Access Memory) 43; and a communication interface 44. The main CPU 41 serves as a processor of the present invention.

The ROM 42 stores the programs and permanent data of a BIOS (Basic Input/Output System) or the like, which is made up of memory devices such as a flash memory and executed by the main CPU 41. When the main CPU 41 executes the BIOS, the predetermined peripherals are initialized and capturing processing is started via the gaming board 50 of the game programs and game system programs stored in the memory card 53. In the present invention, the contents of the ROM 42 may be rewritable or not.

The RAM 43 stores data and programs used when the main CPU 41 is activated. Further, the RAM 43 can store authentication programs, game programs, and game system programs read via the gaming board 50.

In the RAM 43, an area for storing data indicative of total game count C and an area for storing data indicative of the remaining free game count are provided. The remaining free game count is indicative of the remaining counted number of unit free game repeated as a free game.

In the RAM 43, an area for storing an insurance-on mode flag is provided. The insurance-on mode flag is indicative of whether an insurance-on mode or an insurance-off mode is established. The insurance-on mode flag storing area consists of a predetermined bit number of storing areas, for example, and the insurance-on mode flag is set to "ON" or "OFF", according to the contents of storage in the storing area. The insurance-on mode flag "ON" indicates an insurance-on mode and the insurance-off mode flag "OFF" indicates an insurance-off mode. Further, the RAM 43 stores the data of credit amounts and coin insertion numbers or payout numbers in one game.

The communication interface 44 is intended to perform communication with a common display device 200 via a communication line 101. The main CPU 41 transmits to the common display device 200, together with the gaming machine identification number of the gaming machine 10, information such as total game count C, coin insertion count in a game, and payout number, every time one game is performed. The common display device 200 stores a total game count C, a game count, an accumulative coin insertion number, and an accumulative payout number, in association with each of the gaming machine ID numbers.

To the motherboard 40, a main body PCB (Printed Circuit Board) 60 and a door PCB 80, described later, is interconnected by means of a USB. Further, a power unit 45 is connected to the motherboard 40. When power is supplied from the power unit 45 to the motherboard 40, the main CPU 41 of the motherboard 40 is activated. Further, power is supplied to the gaming board 50 via the PCI bus, and then, the CPU 51 is activated.

To the main body 60 and the door PCB 80, equipment or devices, for generating an input signal input to the main CPU 41, and those of which operation is controlled by means of a control signal output from the main CPU 41, are connected. The main CPU 41 executes the game programs and game system programs stored in the RAM 43, based upon an input signal which were input to the main CPU 41, thereby performing predetermined computation to store a result thereof to the RAM 43 or transmit a control signal to equipment or devices in a control process relevant to equipment or devices.

To the main body PCB 60, a lamp 30, a sub CPU 61, a hopper 66, a coin detecting section 67, a graphic board 68, a speaker 29, a touch panel 69, a bill validator 22, a ticket printer 35, a speaker 29, a touch panel 69, a bill validator 22, a ticket printer 35, a card reader 36, a key switch 38S, and a data display 37 are connected. The lamp 30 lights in a predetermined pattern, based upon a control signal output from the main CPU 41.

A sub CPU 61 controls rotation and stoppage of reels 14 (14L, 14C, 14R). To the sub CPU 61, a motor driving circuit 62, which is provided with an FPGA (Field Programmable Gate Array) 63 and a driver 64, is connected. The FPGA 63 is an electronic circuit such as a programmable LSI, and functions as a control circuit of stepping motors 70. The driver 64 functions as a circuit for amplifying the pulses to be input to the stepping motors 70. To the motor driving circuit 62, the stepping motors (70L, 70C, 70R), which perform rotation of each of the reels 14, are connected. Each of the stepping motors 70 is a 1-2 phase-excitation type stepping motor.

In the present invention, the stepping motor excitation system is not limitative thereto in particular, and it is also possible to employ a 2-phase excitation system or a 1-phase excitation system, etc. Further, a DC motor may be employed in place of the stepping motors. If the DC motor is employed, a deviation counter, a D/A converter, and a servo amplifier are sequentially connected to the sub CPU 61. Furthermore, a rotational position of the DC motor is detected by means of a rotary encoder, and thereafter, the current rotational position of the DC motor is supplied as data from the rotary encoder to the deviation counter.

An index detection circuit 65 and a position detection change circuit 71 are connected to the sub CPU 61. The index detection circuit 65 detects a position (index described later) of each of the reels 14 in rotation, and further, is capable of detecting step-out of any of the reels 14. Rotation and stoppage control of the reels 14 will be described later in detail with referring to the drawings.

The position change detection circuit 71 detects a change of a stop position of the reels 14 after rotation of the reels 14 has stopped. For example, the position change detection circuit 71 detects a change of the stop position of the reels 14 according to a case, etc., in which a player forcibly changes the stop position so as to realize a winning combination of symbols, in spite of the fact that none of the winning symbol combinations is actually realized. The position change detection circuit 71 is constituted so that the change of the stop position of the reels 14 can be detected by detecting a fin (not shown) mounted to the inside of the reels 14 at predetermined intervals.

The hopper 66 is installed in a cabinet 11, and a predetermined number of coins are paid out from the coin payout opening 19 to the coin tray 18, based upon the control signal output from the main CPU 41. A coin detecting section 67 is provided inside of the coin payout opening 19, and outputs an input signal to the main CPU 41, if it is detected that a predetermined number of coins have been paid out from the coin payout opening 19.

A graphic board 68 controls the images to be displayed on the upper and lower image display panels 33 and 16, based upon the control signal output from the main CPU 41. The credit amount display panel 31, of the lower image display panel 16, displays the credit amount stored in the RAM 43. Further, the payout number display section 32, of the lower image display panel 16, displays the payout number of coins. The graphic board 68 is provided with: a VDP (Video Display Processor), which generates image data, based upon the control signal output from the main CPU 41; and a video RAM, etc., which temporarily stores image data generated by the VDP. The image data used when the image data is generated by the VDP is read from the memory card 53, and thereafter, is included in the game programs stored in the RAM 43.

The bill validator 22 validates whether or not bills are legitimate, and accepts legitimate bills in the cabinet 11. The bill validator 22 outputs an input signal to the main CPU 41, based upon the amount of the accepted legitimate bills. The main CPU 41 stores in the RAM 43 the amount of credits responsive to the amount of bills transmitted by the input signal.

The ticket printer 35 prints, on tickets, bar codes containing the coded data such as the credit amount, date and time, and ID number of the gaming machine 10, stored in the RAM 43, based upon the control signal output from the main CPU 41, and then, outputs the bar code-attached tickets 39. The card reader 36 reads data from a smart card, thereby transmitting the read data to the main CPU 41 or writing data into the smart card, based upon the control signal from the main CPU 41. The key switch 38S is provided on the key pad 38 and outputs a predetermined input signal to the main CPU 41, when the player operates the key pad 38. The data display 37 displays the data read by the card reader 36 or the data input via the key pad 38 by the player, based upon the control signal output from the main CPU 41.

To the door PCB 80, a control panel 20, a reverter 21S, a coin counter 21C, and a cold cathode-ray tube 81 are connected. On the control panel 20, there are provided: a SPIN switch 23S corresponding to a SPIN button 23; a CHANGE switch 24S corresponding to a CHANGE button 24; a CASH-OUT switch 25S corresponding to a CASHOUT button 25; a 1-BET switch 26S corresponding to a 1-BET button 26; and a MAX-BET switch 27S corresponding to a MAX-BET button 27. Each of the switches 23S to 27S outputs an input signal to the main CPU 41 when the player operates each of the corresponding buttons 23 to 27.

The coin counter 21C is provided inside of the coin insertion slot 21, and validate legitimacy of the coins inserted into the coin insertion slot 21 by the player. Those other than the legitimate coins are ejected from the coin payout opening 19. Further, the coin counter 21C outputs an input signal to the main CPU 41 when a legitimate coin is detected.

The reverter 21S is operable based upon the control signal output from the main CPU 41. This reverter distributes, the coins recognized to be legitimate by the coin counter 21C, into a cashbox (not shown) or a hopper 66 which was installed in the gaming machine 10. In other words, if the hopper 66 is filled with coins, the legitimate coins are distributed to the cashbox by means of the reverter 21S. Otherwise, the legitimate coins are distributed to the hopper 66. The cold cathode-ray tube 81 functions as a backlight installed at the rear side of the lower and upper image display panels 16 and 33, and lights based upon the control signal that was output from the main CPU 41.

Figure 5:
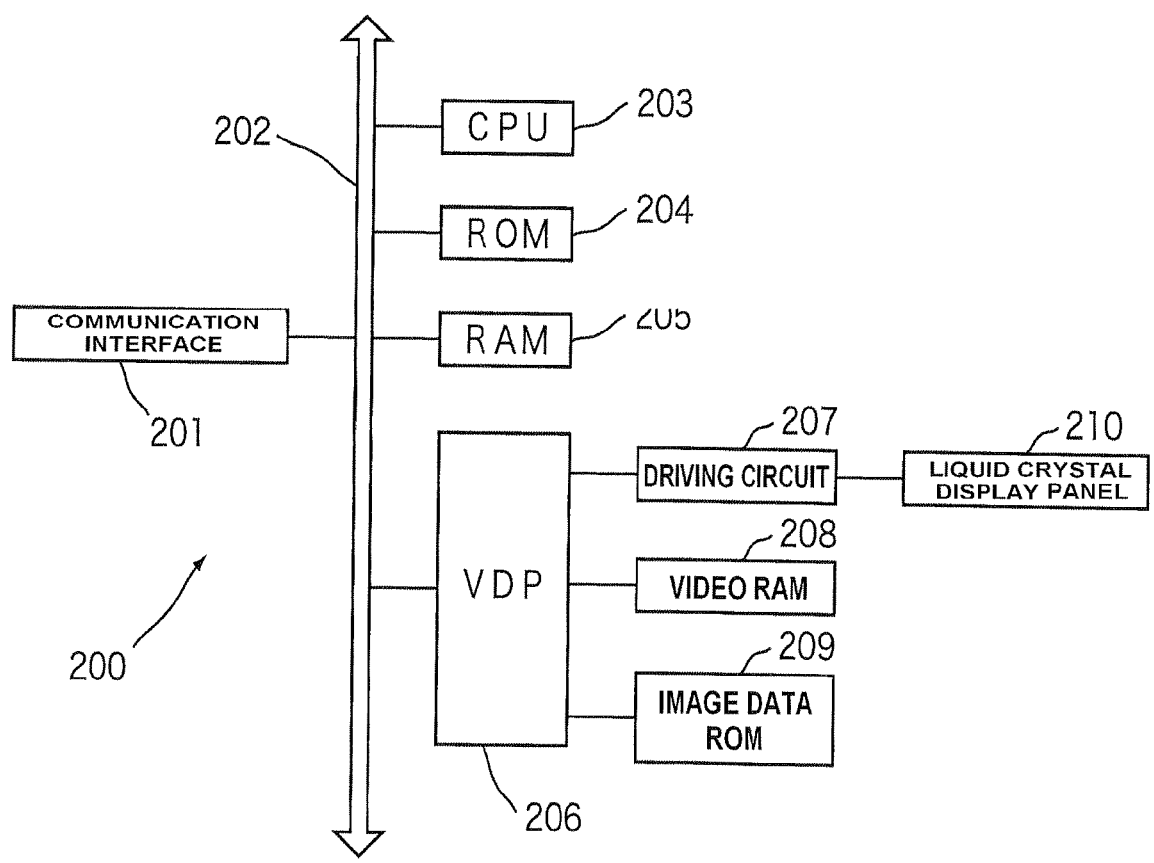
FIG. 5 is a block diagram depicting an internal configuration of a common display device.

FIG. 5 is a block diagram depicting an internal configuration of a common display device 200. The common display device 200 is connected to four gaming machines 10 in the embodiment, and is commonly used by each of the connected gaming machines 10. The common display device 200 is provided with: a communication interface 201; an input/output bus 202; a CPU 203; a ROM 204; a RAM 205; a VDC 206; a driving circuit 207; a video RAM 208; an image data ROM 209; and a liquid crystal display panel 210.

The communication interface 201 is intended for receiving signals or data, etc., which were transmitted from each of the gaming machines 10 and for transmitting required signals or data, etc., to each of the gaming machines 10. The signals or data, which were received at the communication interface 201, are notified to the CPU 203 via an input/output bus 202.

The ROM 204 stores display control programs for generating a drive signal supplied to the liquid crystal display 21, based upon an image display instruction issued by the CPU 203. On the other hand, the RAM 2005 stores values of flags or variables used by the above display control programs.

The VDP 206 is a processor which includes a split circuit, a screen circuit, and a pallet circuit, etc., and which is capable of performing various processing operations for displaying images on the liquid crystal display panel 210.

To the VDP 206, a video RAM 208 for storing image data responsive to the image display instruction issued by the CPU 203; and an image data ROM 209 storing data for displaying various effect images and explanatory images for explaining the contents of a game, are connected. Further, to the VDP 206, a driving circuit 207, which outputs a drive signal for driving the liquid crystal display panel 210, is also connected.

The CPU 203 of the common display device 200 reads and executes display control programs stored in the ROM 204 and reads, from an image data ROM 209, image data for images to be displayed. Then, this CPU causes a video RAM 20 to store the read image data, and then, drives the driving circuit 207 through the VDP 206, thereby displaying images on the liquid crystal display panel 210.

Figure 6:
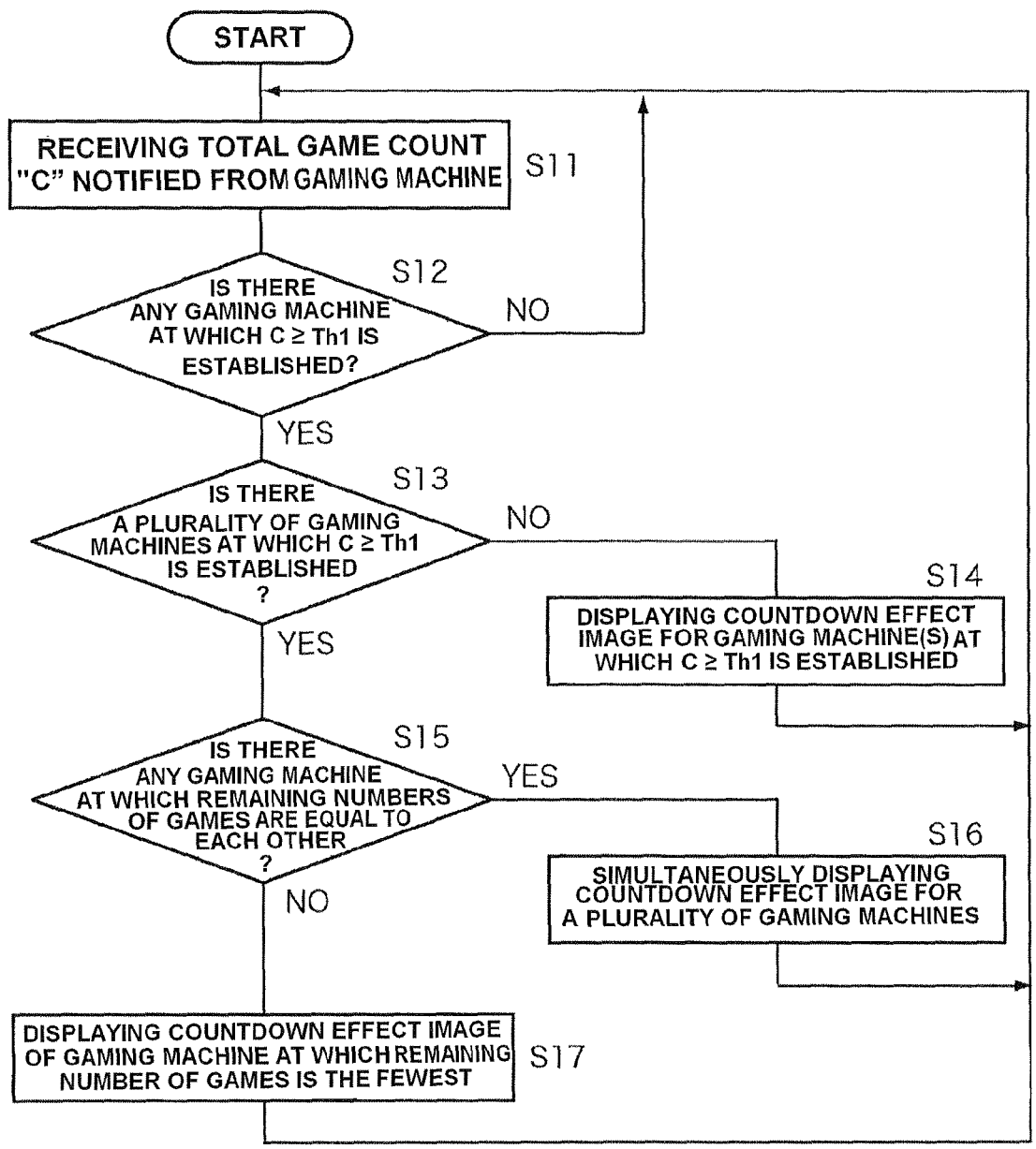
FIG. 6 is a flowchart showing procedures for executing processing in the common display device.

Hereinafter, processing operations, which are performed on the common display device 200, will be described. FIG. 6 is a flowchart showing operating procedures performed on the common display device 200. If the common display device 200 receives total game count C notified from the gaming machine 10 through the communication interface 201 (step S11), the CPU 203 of the common display device 200 compares the total game count C obtained at each of the gaming machines 10 with a first predetermined value Th1. This comparison is performed based upon the ID numbers for identifying the gaming machines 10. In this manner, this CPU judges whether or not there exists any of the gaming machines 10 at which the total game count C is not smaller than the first predetermined value Th1 (step S12).

If it is judged that the total game count is smaller than the predetermined value Th1 as to all of the gaming machines 10 (S12: NO), i.e., if it is judged that no countdown effect is started in all of the gaming machines 10, the routine reverts to step S11. If it is judged that there exists any of the gaming machines 10 at which the total game count is not smaller than the first predetermined value Th1 (S12: YES), i.e., if it is judged that a countdown effect is started at least one of the gaming machines 10, the CPU 203 judges whether or not there exist a plurality of gaming machines 10 at which the countdown effect is started (step S13).

If it is judged that the countdown effect is started at only one of the gaming machines 10 (S13: NO), the CPU 203 reads, from the image data ROM 209, the countdown effect image that was stored in association with the ID number of such machine, to cause the video RAM 208 to store the read image, and then, drive the driving circuit 207 through the VDP 206, thereby displaying the countdown effect image for the gaming machine 10 on the liquid crystal display panel 210 (step S14).

If it is judged that the countdown effect is started at two or more of the gaming machines 10 (S13: YES), the CPU 203 compares the total game counts C among the gaming machines 10 at which the countdown effect is started, and then, judges whether or not there exists any of the gaming machines 10 at which the remaining game numbers are equal to each other until a free game is started (step S15). If the judgment result is affirmative (S15: YES), the countdown effect images of these gaming machines 10 are displayed simultaneously (step S16). At this time, the CPU 203 sequentially reads, from the image data ROM 209, the countdown effect images associated with the ID numbers of the gaming machines 10, respectively, at which the countdown effect is started. Then, this CPU combines the plurality of the read count effect images with each other at the VDC 206; and then, stores them in the video RAM 208. After that, the CPU 203 is caused to drive the driving circuit 207 through the VDP 206, thereby simultaneously displaying the plurality of countdown effect images.

Figure 7:
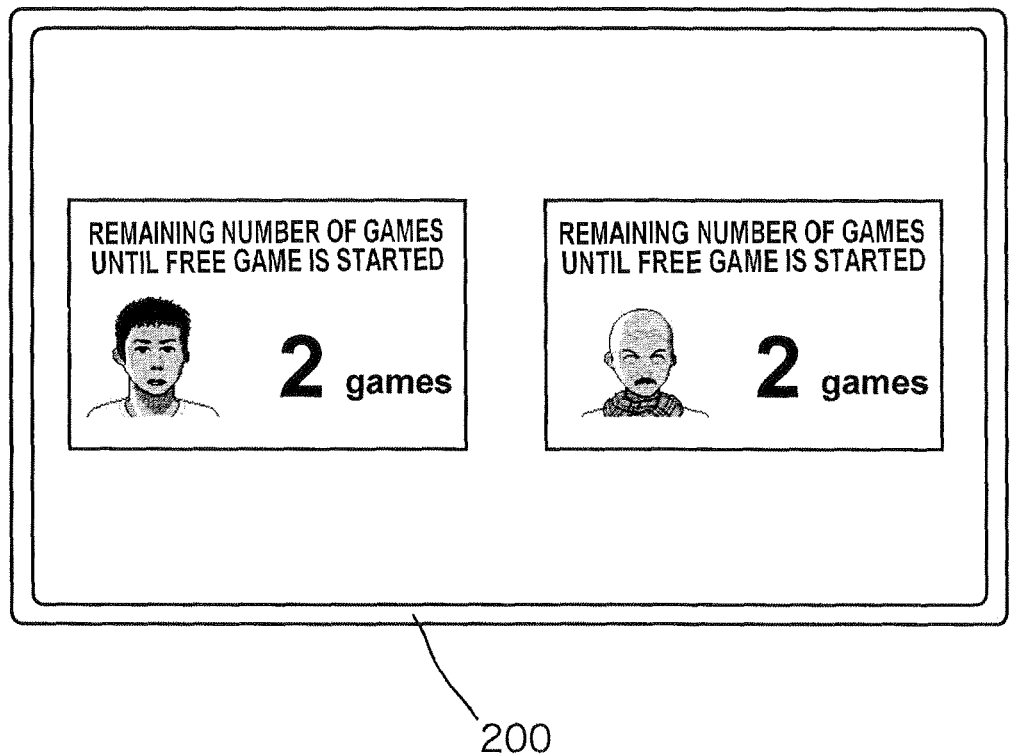
FIG. 7 is a schematic view showing an exemplary display in a case where a plurality of countdown effect images are displayed simultaneously on the common display device.

FIG. 7 is a schematic view showing an exemplary display if a plurality of countdown effect images are displayed simultaneously at the common display device 200. In the example shown in FIG. 7, there is shown how the countdown effect images of the gaming machines 10B and 10D are displayed simultaneously at the common display device 200.

While, in the present embodiment, if there exist a plurality of gaming machines 10 at which the countdown effect is started, and then, it is judged that there exists any of the gaming machines at which the remaining game counts are equal to each other until a free game is started, the countdown effect images of these gaming machines 10 are displayed simultaneously on the common display device 200, the countdown effect images may be alternately displayed by changing them on a time-interval basis (every 2 seconds). FIG. 8 is a schematic view showing an exemplary display if a plurality of countdown effect images are alternatively displayed on the common display device 200. In the example shown in FIG. 8, there is shown how the countdown effect images of the gaming machines 10B and 10D are displayed on the common display device 200 while alternatively changing them.

The technique of displaying the plurality of countdown effect images is not limitative to the simultaneous display and alternate display described above, and any images or video images may be employed as long as they show that the remaining game counts are equal to each other at the plurality of gaming machines 10.

If it is judged that the countdown effect is started at two or more of the gaming machines 10 (S13: YES) and if it is judged that there does not exist any of the gaming machines 10 at which the remaining game counts are equal to each other until a free game is started (S15: NO), the CPU 203 reads, from the image data ROM 209, the countdown effect image stored in association with the ID number of the gaming machine at which the remaining game count is the fewest. Then, this CPU causes the video RAM 208 to store the read image, and then, drive the driving circuit 207 through the VDP 206, thereby displaying, on the liquid crystal display panel 210, the countdown effect image for the gaming machine 10 (step S17). An exemplary display of the countdown effect image at this time is as shown in FIG. 1.

After the countdown effect image is displayed at steps S14, S16, and S17, the routine reverts to step S11. The processing operations at step S12 and subsequent are performed at the common display device 200 every receipt of the total game count C notified from each of the gaming machines 10. Thus, after the remaining game count of one of the gaming machines 10 is fewer than that of any other one, for example, the display of the countdown effect image of such other gaming machine(s) is canceled. Therefore, it is possible to arouse the players' sense of competition more because they try to increase the game count so as not to eliminate their own countdown effects. Further, the surrounding spectators can be also aware of the fact that the players compete against each other, so that the amusement place and its periphery are in great bustle and become lively.

Figure 9:
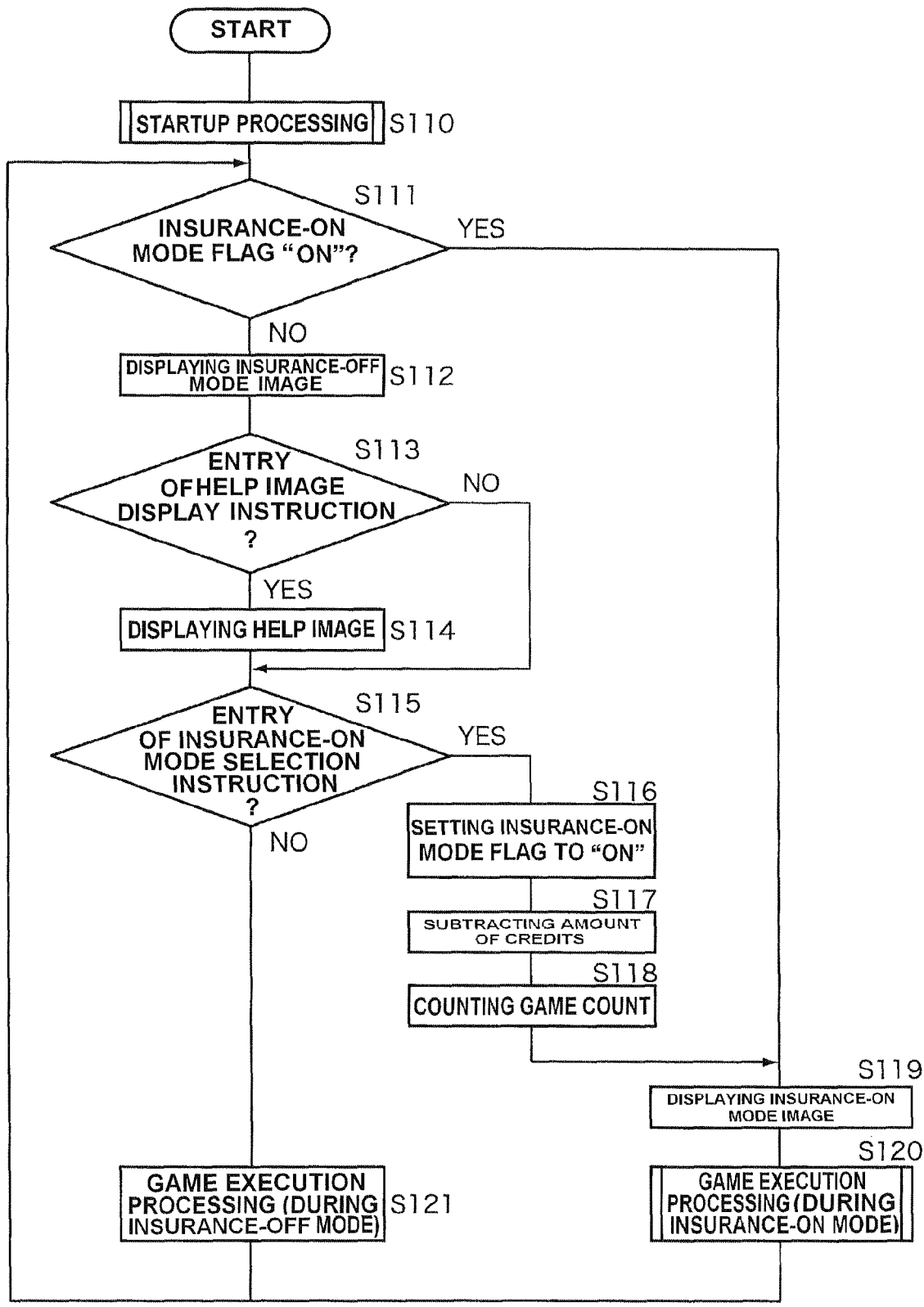
FIG. 9 is a flowchart showing procedures for executing main processing at the gaming machine.

Hereinafter, the processing operations, which will be performed at each of the gaming machines 10, will be described. FIG. 9 is a flowchart showing procedures for executing main processing at each of the gaming machines 10. First, startup processing is performed at each of the gaming machines 10 (step S110). The startup processing will be described later in detail. While this subroutine is executed, the main CPU 41 performs processing of adding the credit amount stored in the RAM 43 as interruption processing, upon the receipt of a detection signal output from the coin counter 21C when the coin counter 21C detects the coins inserted into the coin insertion slot 21.

First, the main CPU 41 judges whether or not the insurance-on mode flag stored in the RAM 43 is set to "ON" (step S111). If this insurance-on mode flag is not set to "ON", i.e., if it is set to "OFF", this CPU performs processing of displaying insurance-off mode images (step S112). In this processing operation, the main CPU 41 transmits an instruction for graphically plotting insurance-off mode images to a graphic board 68. On the graphic board 68, based upon the above plotting instruction, the VDP samples image data from the RAM 43 to decompress the sampled data in the video RAM; generates one-fame image data; and outputs the image data to the upper and lower image display panels 33 and 16. As the result thereof, the upper and lower image display panels 33 and 16 display the images as shown in FIG. 10, for example.

Figure 10:
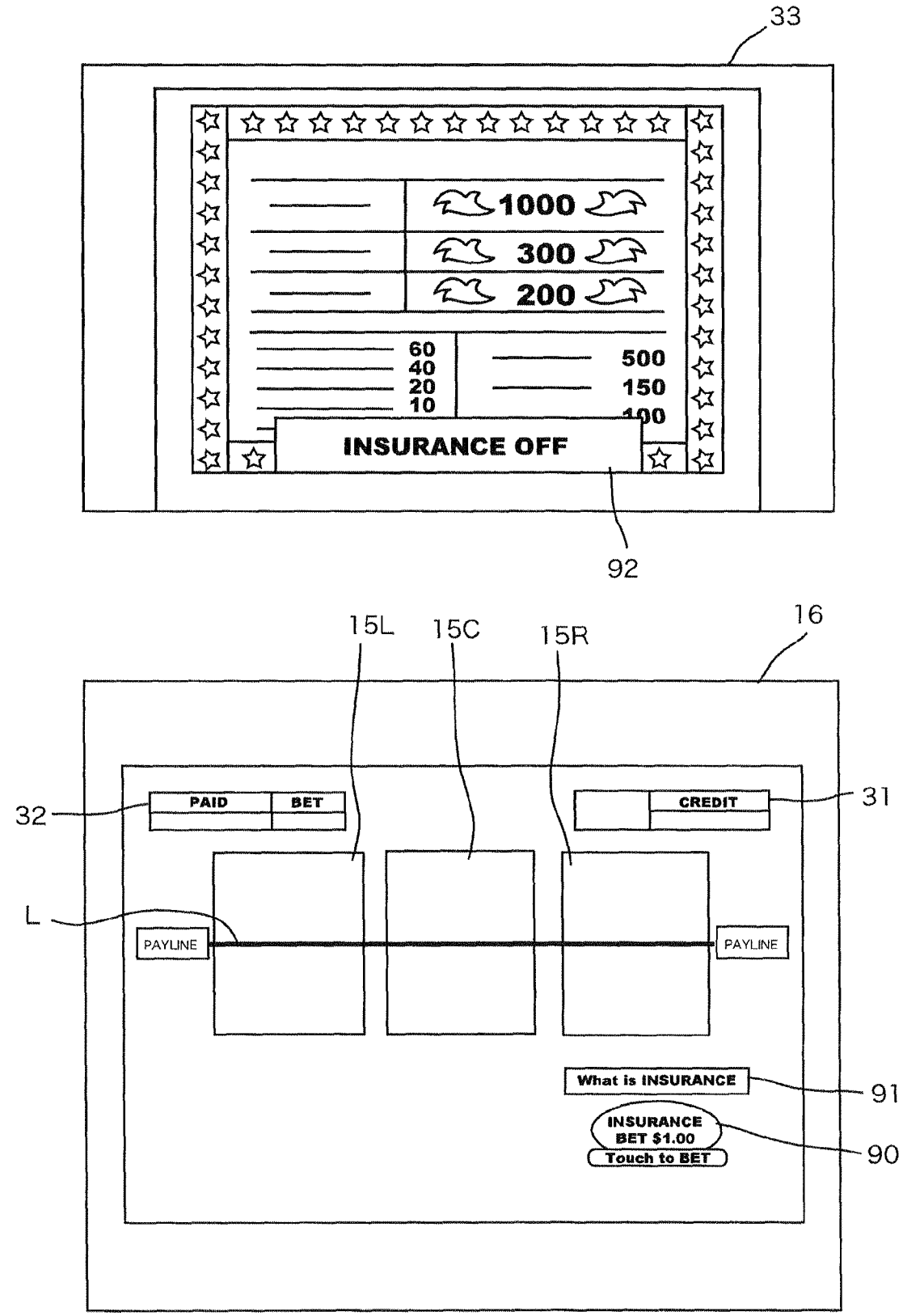
FIG. 10 is a view showing exemplary images displayed on an upper image display panel and a lower image display panel in an insurance-off mode.

FIG. 10 is a view showing exemplary images displayed on the upper and lower image display panels in an insurance-off mode. In the figure, reference numerals 15 (15L, 15C, 15R) denote display windows. Reference numeral 31 denotes a credit amount display section. Reference numeral 32 denotes a payout number display section. Uppercase letter L denotes a payline. An image 90, which is indicative of "INSURANCE BET $1.00 TOUCH TO BET", is displayed at the lower right part of the lower image display panel 16. An image 90 is intended for prompting a player to select an insurance-on mode and to insert a gaming medium required for such selection. A player can enter an instruction for selecting an insurance-on mode, by touching a predetermined site of a touch panel 69 corresponding to a display area of the image 90.

In order to select the insurance-on mode, a predetermined credit amount (1 dollar in the embodiment) is required. In place of the credit amount, bills or coins equivalent thereto may be inserted. If the instruction for selecting the insurance-on mode has not been entered, the insurance-off mode is selected.

Upwardly of the image 90, an image which is indicative of "WHAT IS INSURANCE?" is displayed. The image 91 is intended for entering an instruction for displaying a help image. A player can enter the instruction for displaying the held image, by touching the predetermined site of the touch panel 69 corresponding to the display area of the help image. An image 92, which is indicative of "INSURANCE OFF", is displayed at the lower part of the upper image display panel 33. The image 92 is indicative of the fact that a game mode is an insurance-off mode.

Following the completion of the processing at step S112, the main CPU 41 judges whether or not an instruction for displaying a help image has been entered (step S113). The instruction for displaying the help image is entered when the player touches the predetermined site of the touch panel 69 corresponding to the display area of the image 91, as described above.

If the above instruction is entered, processing of displaying the help image is performed (step S114). In this processing operation, the main CPU 41 transmits a graphics-drawing command to a graphic board 68. The graphic board 68 performs processing of displaying images on the upper and lower image display panels 33 and 16, based upon the abovementioned graphics-drawing command. As the result thereof, the upper and lower image display panels 33 and 16 display the images as shown in FIG. 11, for example.

FIG. 11 is a view showing exemplary images displayed on the upper and lower image display panels in the insurance-off mode. The images displayed on the upper and lower image display panels 33 and 16 are substantially identical to those shown in FIG. 10, whereas they are different therefrom in that a help image 93 is displayed at the upper part of the upper image display panel 33. The help image 93 is intended for explaining: (a) the number of times of executing games that took place until a free game (rescue pay) is started; and the number of coins (360) paid when the number of times of executing games reaches a specific value. The help image 93 indicates an explanatory statement of the insurance-on mode. The help image 93 shown in FIG. 11 disappears when a predetermined period of time (10 seconds, for example) has elapsed after displayed.

If the processing at the step S114 is executed, or alternatively, if the instruction for displaying the help image is not entered, the main CPU 41 judges whether or not the instruction for selecting the insurance-on mode has been entered (step S115). The instruction for selecting the insurance-on mode is entered when the player touches the predetermined site of the touch panel 69 corresponding to the display area of the image 90, as described above.

When the instruction for selecting the insurance-on mode has been entered, the main CPU 41 set to "ON" the insurance-on mode flag stored in the RAM 43 (step S116). Subsequently, the main CPU 41 performs processing of subtracting a predetermined amount (credit amount equivalent to 1 dollar in the embodiment) from the credit amount stored in the RAM 43 (step S117), and then, starts counting the game count C (step S118). At this time, the main CPU 41 sets the total game count C to zero.

If it is judged that the insurance-on mode flag is set to "ON" at step 111, or alternatively, if the processing at step S118 is executed, the processing of displaying the insurance-on mode image is performed (step S119). In this processing operation, the main CPU 41 transmits a command for graphically drawing the insurance-on mode image to the graphic board 68. On the graphic board 68, based upon the above graphics-drawing command, the VDP samples image data from the RAM 43 (memory device); decompresses the sampled data on the video RAM; generates image data for one frame; and then, outputs the image data to the upper and lower image display panels 33 and 16. As the result thereof, the upper and lower image display panels 33 and 16 display the images as shown in FIG. 12, for example.

FIG. 12 is a view showing exemplary images displayed on the upper and lower image display panels in the insurance-on mode. At the lower right part of the lower image display panel 16, an image 90a, which is indicative of "INSURANCE IS ONGOING! TOUCH TO SEE HELP", is displayed in place of the image 90 (see FIG. 10). The image 90a is indicative of the fact that the game mode is the insurance-on mode, and is intended for entering the instruction for displaying the help image. The player can enter the instruction for displaying the help image by touching the predetermined site of the touch panel 69 corresponding to the display area of the image 90a. At the lower part of the upper image display panel 33, an image 92a is displayed which is indicative of "INSURANCE IS ONGOING! 1,000 GAMES UNTIL FREE GAME STARTS". The image 92a is indicative of the fact that the game mode is the insurance-on mode.

After the processing at step S119, the main CPU 41 performs game execution processing during the insurance-on mode (step S120). This processing operation will be described later with referring to FIG. 13.

If the instruction for selecting the insurance-on mode is not entered at step S115, the main CPU 41 performs game execution processing during the insurance-off mode (step S121). This processing operation is substantially similar to the game execution processing (see FIG. 13) during the insurance-on mode, except that processing relevant to counting the number of times of executing games, and thus, a duplicate description is omitted here. During the insurance-off mode, the upper image display panel 33 displays the image 92, and the lower image display panel 16 displays images 90, 91. If the processing at step S120 or S121 is executed, the routine then reverts to step S111.

While the embodiment described a case in which the upper and lower image display panels 33 and 16 display the images 90a, 92a for notifying a transfer to the insurance-on mode, a sound for notifying the transfer to the insurance-on mode may be output from the speaker 29, in the present invention.

Figure 13:
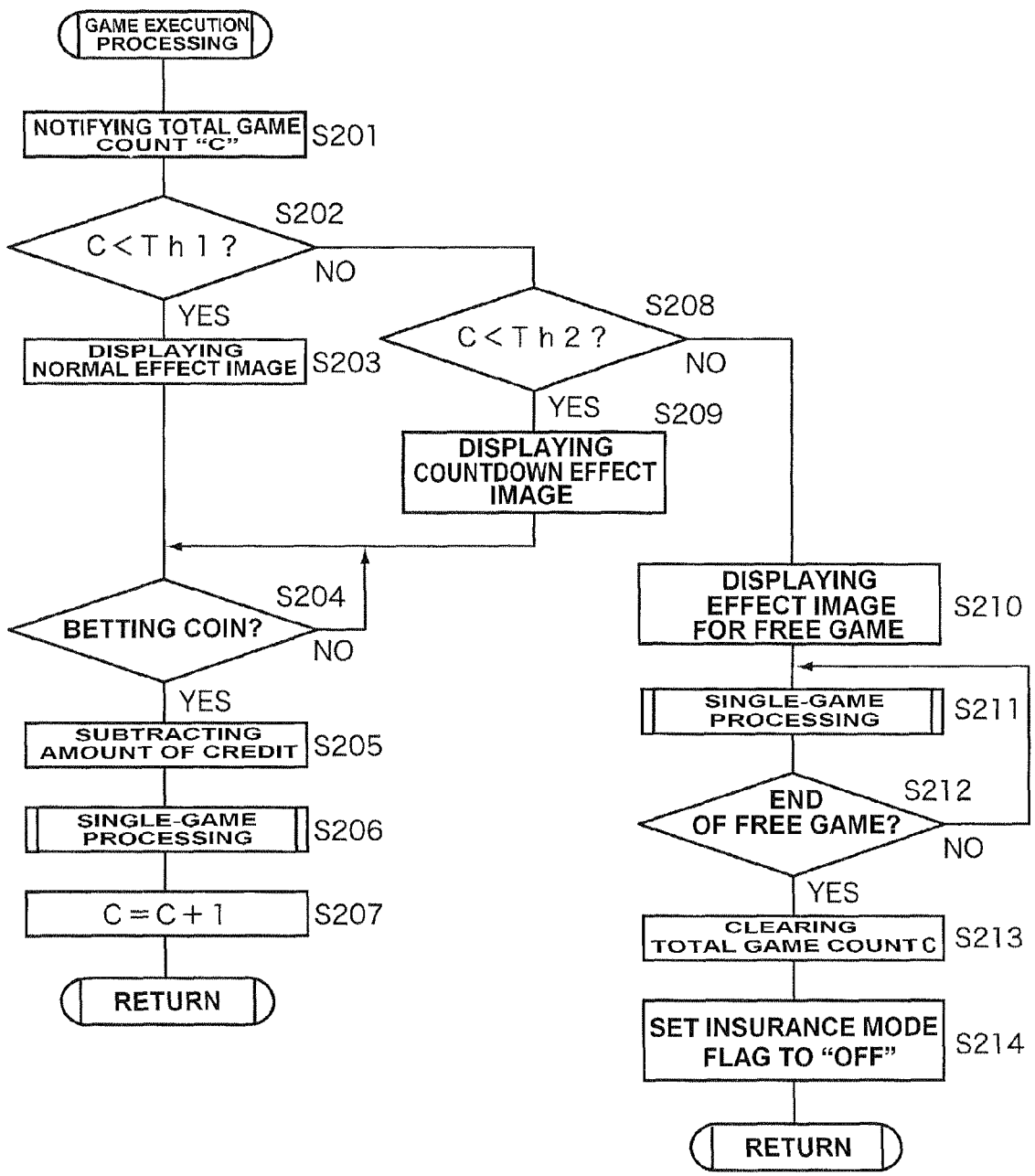
FIG. 13 is a flowchart showing procedures for performing games during the insurance-on mode.

Next, game execution processing during the insurance-on mode read at step S120 of the main routine shown in FIG. 9 will be described. FIG. 13 is a flowchart showing procedures for performing the game execution processing during the insurance-on mode. First, the main CPU 41, together with the ID number assigned thereto, notifies the current total game count C to a common display device 200, through a communication interface 44 (step S201).

Subsequently, the main CPU 41 judges whether or not the current total game count C is less than the abovementioned first predetermined value Th1 (990 in the embodiment) (step S202). If it is judged that the current total game count C is less than the first predetermined value Th1 (S202: YES), processing of displaying a normal effect image is performed (step S203). In this processing operation, the main CPU 41 transmits a command for graphically drawing normal effect images to the graphic board 68. On the graphic board 68, based upon the abovementioned graphics-drawing command, the VDP samples image data from the RAM 43; decompresses the sampled data on the video RAM; generates image data for one frame; and then, outputs the image data to the lower image display panel 16. As the result thereof, the lower image display panel 16 displays a normal effect image. This normal effect image is different from the abovementioned countdown effect image, and is intended for augmenting a base game.

Next, it is judged whether or not coins are betted (step S204). In this processing operation, the main CPU 41 judges whether or not an input signal output from a 1-BET switch 26S when a 1-BET button 26 is operated or that output from a MAX-BET switch 27S when a MAX-BET button 27 is operated has been received. If it is judged that no coins are betted (S204: NO), the routine reverts to step S204.

If it is judged that coins are betted at step S204 (S204: YES), the main CPU 41 performs processing of subtracting the credit amount stored in the RAM 43, in accordance with the number of betted coins (step S205). If the number of coins to be betted is greater than the credit amount stored in the RAM 43, this CPU does not perform the subtraction processing, and the routine reverts to step S204.

Subsequently, the main CPU 41 executes single-game processing described later (step S206). The procedures for executing the single-game processing will be described later in detail. Here, a game is performed in such a manner that, while it is triggered that the SPIN button 23 is turned ON by the player, processing is performed for rotational control of the reels 14 and determining symbols to be stopped, and thereafter, a payment is made in accordance with the stopped symbols or a combination thereof. After the end of this single-game processing, the main CPU 41 increments, by 1, the value of total game count C to be stored in the RAM 42 (step S207). After that, the routine reverts to the main routine shown in FIG. 9.

If it is judged that the current total game count C is not smaller than the first predetermined value Th1 (S202: NO), the main CPU 41 judges whether or not the current total game count C is smaller than the second predetermined value Th2 (1,000 in the embodiment) (step S208). If it is judged that the current total game count C is equal to or greater than the first predetermined value Th1 and is smaller than the second predetermined value Th2 (S208: YES), processing of displaying a countdown effect image is performed (step S209). In this processing operation, the main CPU 41 transmits a command for graphically drawing the countdown effect image to the graphic board 68. On the graphic board 68, the VDP samples image data; decompresses the sampled image data on the video RAM; generates image data for one frame; and outputs the image data to the upper image display panel 33. As the result thereof, the upper image display panel 33 displays the countdown effect image as shown in FIG. 1. After that, the routine proceeds to the abovementioned step S204, and continuously, a base game is implemented.

If it is judged that the current total game count C reached the second predetermined value Th2 at step S208 (S208: NO), the free game as described above is started. Because the total game count C reached the second predetermined value Th2, processing is performed for displaying free game-destined effect images such as images which are indicative of the fact that a predetermined number of coins (360 in the embodiment) are paid out as a rescue pay and those which are indicative of the remaining free game count (step S210). In this processing operation, the main CPU 41 transmits a command for graphically drawing free game-destined effect images to the graphic board 68. On the graphic board 68, based upon the abovementioned graphics-drawing command, the VDP samples image data from the RAM 43; decompresses the sampled data on the video RAM; generates image data for one frame; and then, outputs the image data to the upper image display panel 33. As the result thereof, the upper image display panel 33 displays free game-destined effect images.

Next, the single game processing described later is executed (step S211). Procedures for performing the single-game processing will be described later. A game is executed in which, while it is triggered that the SPIN button 23 is turned ON by the player, rotational control of the reels 14 and processing of determining symbols to be stopped are performed, and a payment is made in accordance with stopped symbols or a combination thereof.

The main CPU 41 judges whether or not to terminate a free game by judging whether or not the number of times of executing the single-game processing at step S211 executed as a free game reached a predetermined number of times (step S212). If it is judged that the free game is not terminated (S212: NO), the routine reverts to step S211. If it is judged that the free game is terminated (S212: YES), the main CPU 41 clears the total game count C stored in the RAM 42 (step S213), and then, sets the insurance-on mode flag to OFF (step S214). After that, the current step reverts to the main routine shown in FIG. 9.

While the present embodiment described the configuration in which every time a base game is implemented, the total game count C is notified to the common display, a configuration may be provided in which, if the number of times of executing base games reached a specific number of times which is equal to or smaller than the first predetermined value Th1 (third predetermined value, for example, 899), the total game count C is notified. In this case, only in the case where a countdown effect is oncoming, communication between the gaming machine 10 and the common display device 200 is performed, thus making it possible to reduce a communication volume therebetween.

Figure 14:
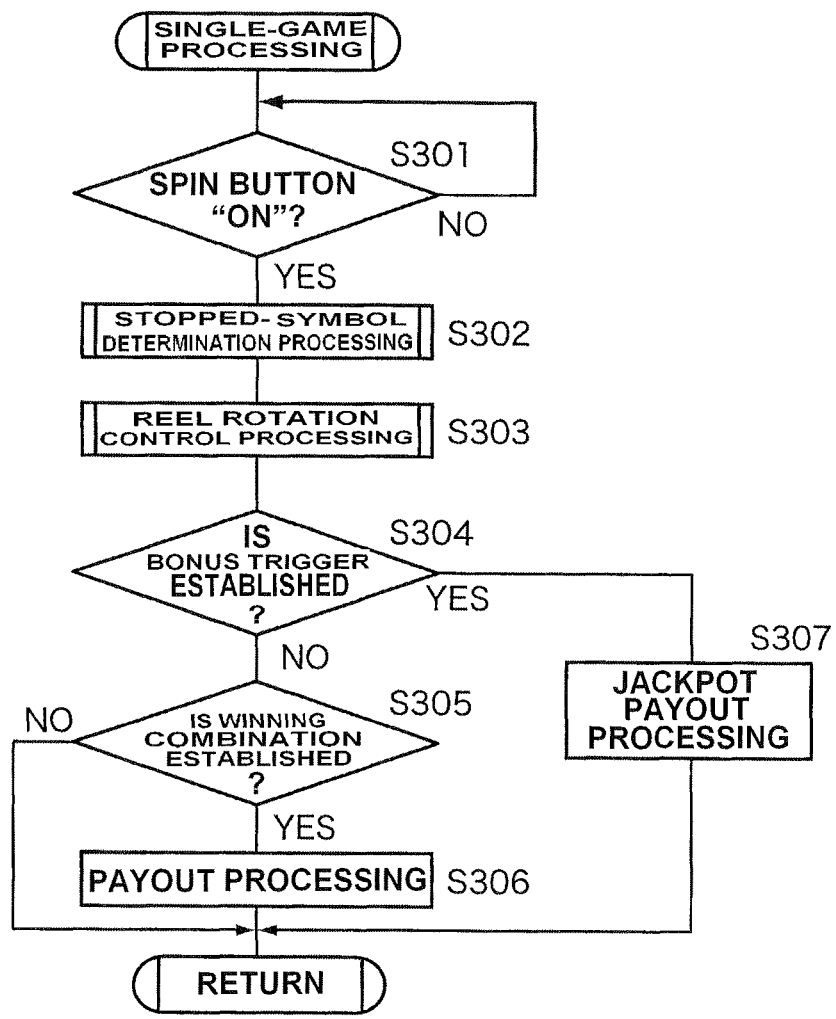
FIG. 14 is a flowchart showing procedures for executing single-game processing.

Next, the single-game processing invoked at steps S206 and S211 of the subroutine shown in FIG. 13 will be described. FIG. 14 is a flowchart showing the procedures for performing the single-game processing. First, the main CPU 41 judges whether or not the SPIN button 23 has been turned ON (step S301). In this processing operation, the main CPU 41 judges whether or not the input signal output from the SPIN switch 23S has been received when the SPIN button 23 has been depressed. If it is judged that the SPIN button 23 has not been turned ON (step S310: NO), the routine reverts to step S301. If the SPIN button 23 has not turned ON (for example, if an instruction for terminating a game without turning ON the SPIN button 301 is entered), the main CPU 41 cancels a subtraction result at step S205.

While the present embodiment describes a case of performing processing of subtracting the credit amount before judging whether or not the SPIN button 23 has been turned ON after coins have been betted, the present invention is not limitative thereto. For example, it may be a routine to perform processing of judging whether or not the SPIN button 23 has been turned ON after coins have been betted, and then, subtracting the credit amount in the case where the judgment result is affirmative.

If it is judged that the SPIN button 23 has been turned ON at step S301 (S301: YES), the main CPU 41 performs stopped-symbol determination processing (step S302). In this processing operation, the main CPU 41 determines code No. at the time of stoppage of the reels 14, by executing the stopped-symbol determination program stored in the RAM 43. In this manner, a combination of symbols displayed in a stopped state is determined. This determination processing will be described later in detail.

While the present embodiment describes a case of determining one winning combination from among plural kinds of winning combinations by determining a combination of symbols displayed in a stopped state, for example, in the present invention, it may be a routine to determine one winning combination randomly selected from among plural kinds of winning combinations with the use of random number values, and thereafter, determine the combination of the symbols displayed in a stopped state, based upon the abovementioned winning combination.

Next, the main CPU 41 performs reel rotation control processing (step S303). This processing operation is intended to stop rotation of each reel, so that a combination of specific symbols corresponding to the winning combination determined at step S302 is displayed in a stopped state on the payline L after rotation of all of the reels 14 is started. A detailed description thereof will be given later.

Next, the main CPU 41 judges whether or not a bonus game trigger has been established (step S304). If the judgment result is affirmative (S304: YES), any one jackpot is selected from among four different types of jackpots "GRAND", "MAJOR", "MINOR", and "MINI" with the use of random number values, and a predetermined number of coins for such jackpot are paid out (step S307). In the case of reserving coins, the main CPU 41 performs processing of adding the credit amount stored in the RAM 43. On the other hand, in the case of paying out coins, the main CPU 41 transmits a control signal to a hopper 66, and then, pays out the predetermined number of coins. At that time, a coin detecting section 67 counts the number of coins paid out from the hopper 66, and then, transmits a payout completion signal to the main CPU 41 when the counted value reached a specified number. In this manner, the main CPU 41 stops driving the hopper 66, and then, terminates coin payout processing.

If no bonus game trigger is established at step S304 (S304: NO), the main CPU 41 judges whether or not a winning combination is realized (step S305). If the judgment result is affirmative (S305: YES), the main CPU 41 pays out coins according to the number of inserted coins and the realized winning combination (step S306). If it is judged that no winning combination is realized in step 305, or alternatively, if the processing at step S306 or S307 is executed, this subroutine is terminated.

Figure 15:
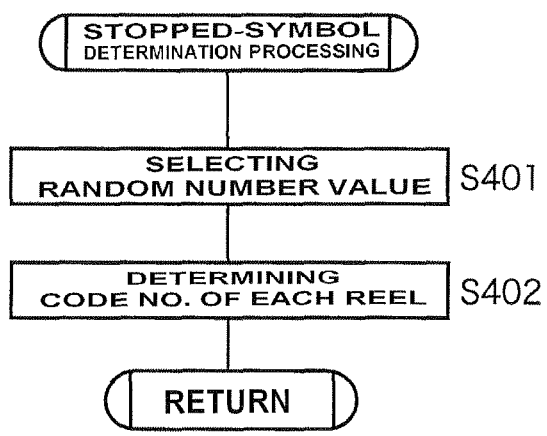
FIG. 15 is a flowchart showing procedures for determining symbols to be stopped.

Next, the stopped-symbol determination processing invoked at step S302 of the subroutine shown in FIG. 14 will be described. FIG. 15 is a flowchart showing procedures for performing the stopped-symbol determination processing. This processing operation is performed by the main CPU 41 executing the stopped-symbol determination program stored in the RAM 43. First, the main CPU 41 executes a random number generation program included in the stopped-symbol determination programs, thereby selecting the random number value corresponding to each of the three reels 14, from the numeric range of 0 to 255 (step S401). The present embodiment describes a case of generating random numbers in a programmable fashion (a case of using so called software random numbers). In the present invention, however, a random number generator is provided, whereby random numbers may be sampled from the random number generator (so called hardware random numbers may be used).

Next, the main CPU 41 (processor) refers to symbol-weighted data according to the payout rate setting data that is output from the GAL 54 and stored in the RAM 43 (storage device), and then, determines code No. (see FIG. 3) of each of the reels 14, based upon the selected three random number values (step S402). Code Nos. of the reels 14 correspond to those of the symbols displayed in a stopped state on the payline L. Reel rotation control processing described later is performed based upon the reel code Nos.

Figure 16:
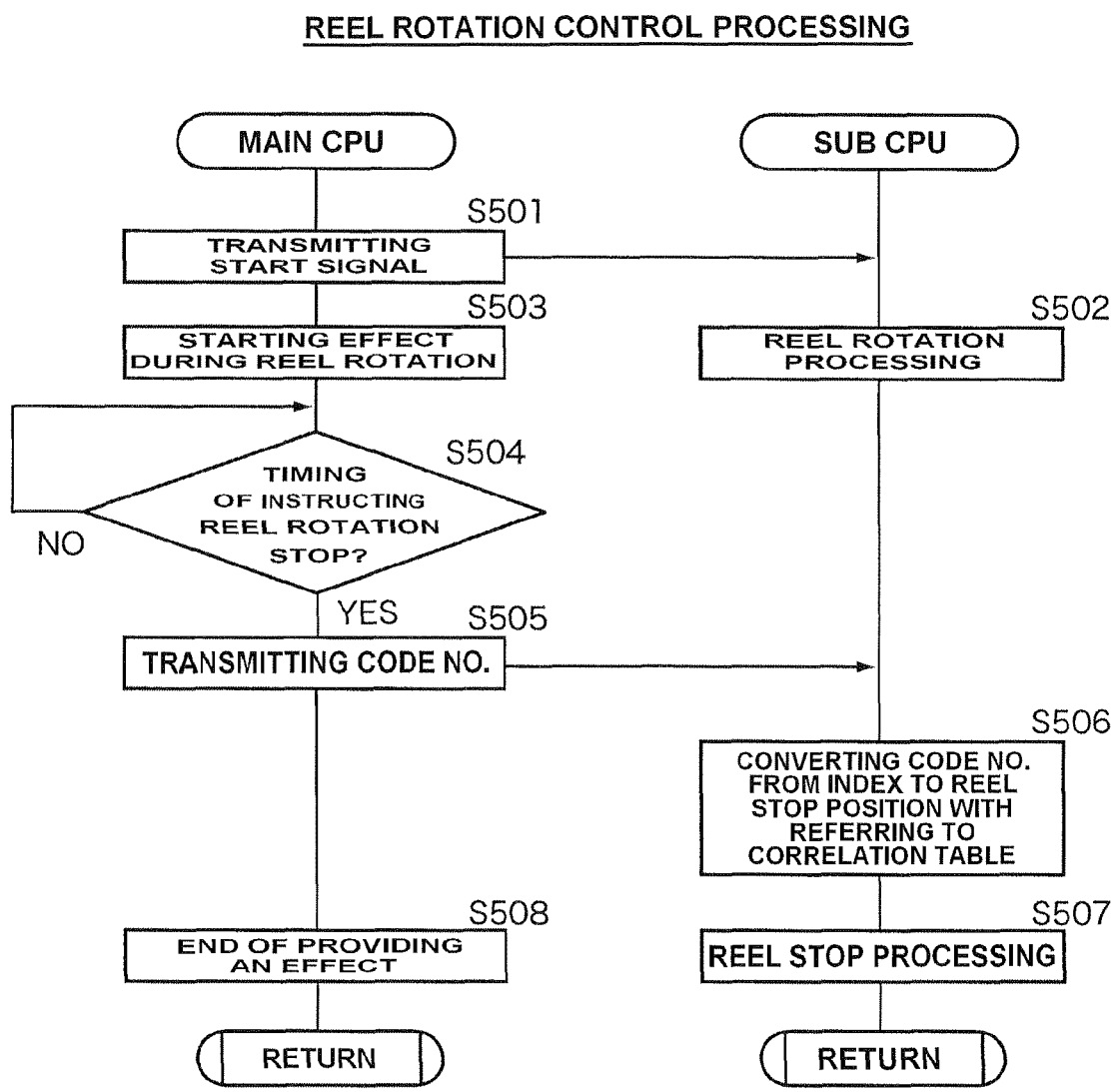
FIG. 16 is a flowchart showing procedures for executing reel rotation control processing.

Next, the reel rotation control processing invoked at step S303 of the subroutine shown in FIG. 14 will be described. FIG. 16 is a flowchart showing procedures for performing reel rotation control processing. This processing operation is performed between the main CPU 41 and a sub CPU 61.

First, the main CPU 41 transmits to the sub CPU 61 a start signal for storing reel rotation (step S501). Upon the receipt of the start signal from the main CPU 41, the sub CPU 61 performs reel rotation processing (step S502). In this processing operation, the sub CPU 61 supplies pulses to a motor driving circuit 62. The pulses output from the sub CPU 61 are amplified by means of a driver 64, and then, the amplified pulses are supplied to stepping motors 70 (70L, 70C, 70R). As the result thereof, each of the stepping motors 70 rotates, and concurrently, each of the reels 14 (14L, 14C, 14R) rotates. In the 1-2 phase-excitation type stepping motors 70, a stepping angle is 0.9 degrees, and the number of steps per rotation is 400. Therefore, if 400 pulses are supplied to the stepping motors 70, the reels 14 make one rotation.

At the time of starting rotation of the reels 14, the sub CPU 206 supplies pulses with low frequencies to the motor driving circuit 62, and then, gradually increases the frequencies of the pulses. Concurrently, the rotation speed of each of the reels 14 increases. When a predetermined time has elapsed, the frequencies of the pulses are made uniform. As the result thereof, each of the reels 14 rotates at a constant speed.

Figure 17A:
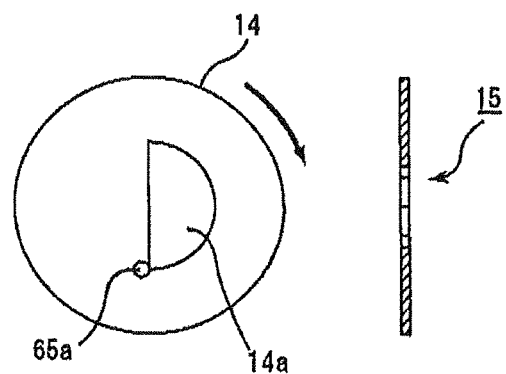
FIGS. 17A to 17D are side views for explaining reel rotating operation.

Now, rotating operation of each of the reels 14 will be described with referring to FIGS. 17A to 17D. These figures are side views for explaining rotating operation of each of the reels 14. As shown in FIG. 17A, a semicircular metal plate 14a is provided on a side face of each of the reels 14. The metal plate 14a rotates with each of the reels 14. Further, 22 symbols are provided to be drawn on the peripheral face of each of the reels 14. From among these 22 symbols drawn on the peripheral face thereof, three symbols can be visually recognized via the display window 15 formed in front of each of the reels 14. In the figure, the arrows indicated by the solid lines indicate rotational directions of the reels 14. Further, a proximal sensor 65a is provided laterally of each of the reels 14. The proximity sensor 65a is intended to detect the metal plate 14a. The proximity sensor 65a neither moves nor rotates, even if each of the reels 14 rotates.

Figure 17B:
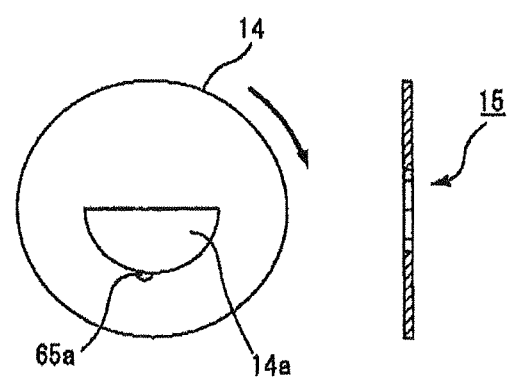
Figure 17C:
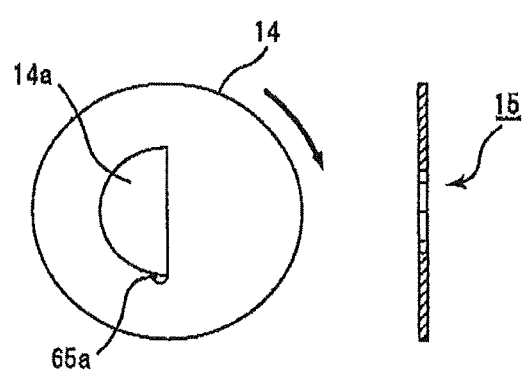

FIG. 17A shows a position (hereinafter, referred to as a "position A") of the metal plate 14a at a time point at which the plate is about to be detected by means of a proximity sensor 65a. If the reels 14 rotate when the metal plate 14a is set at the position A, this plate moves to the position shown in FIG. 17B. FIG. 17B shows a position (hereinafter, referred to as a "position B") of the metal plate 14a when the plate is detected by means of the proximity sensor 65a. If the reels 14 rotate when the metal plate 14a is set at the position B, the metal plate 14a moves to the position shown in FIG. 17C. FIG. 17C shows a position (hereinafter, referred to as a "position C") of the metal plate 14a at a time point at which the plate is not detected by means of the proximity sensor 65a.

Figure 17D:
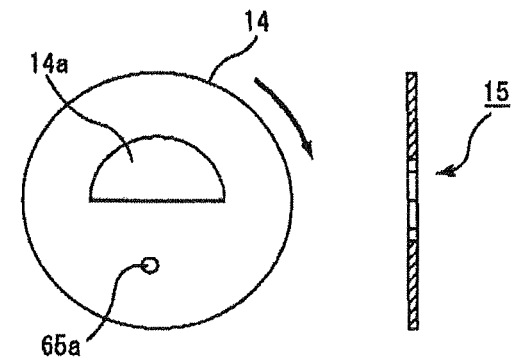

If each of the reels 14 rotates when the metal plate 14a is set at the position C, the plate moves to the position shown in FIG. 17D. FIG. 17D shows a position (hereinafter, referred to as a "position D") of the metal plate 14a when it is not detected by means of the proximity sensor 65a. If the reels 14 further rotate, the metal plate 14a reverts to the position A. As described above, the plate 14a is sequentially shifted to positions A, B, C, D, and then, to A, together with rotation of the reels 14.

The proximity sensor 65a constitutes an index detection circuit 65 (see FIG. 3). Assuming that a state in which the proximity sensor 65a is detecting the metal plate 14a is established at "High" and a state in which such detection is not being performed is established at "Low", when the metal plate 14a is shifted to the positions C, D, and then, to A, the state of the index detection circuit 65 is established at "Low". The sub CPU 61 recognizes the rotational position of each of the reels 14 while a rising edge from "Low" to "High" is defined as an index (origin) 1 and a falling edge from "High" to "Low" is defined as an index (origin) 2.

The main CPU 40 executes an effect at the time of reel rotation after transmitting a start signal to the sub CPU 61 at step S40 (step S503). This processing operation is intended to display an image on the lower image display panel 16 or outputs a sound from the speaker 29, over a period (3 seconds, for example) which is defined responsive to a result, etc. of the abovementioned stopped-symbol determination processing.

Next, the main CPU 40 judges whether or not a timing of instructing rotation stop of the reels 14 is established (step S504). The above timing of the instruction denotes that which is earlier than a time point of terminating an effect at the time of reel rotation by a minimally required time for stopping rotation of the reels 14. The minimally required time therefor is predetermined.

If the judgment result at step S504 is negative (S504: NO), the routine restarts from the same step at which the effect at the time of reel rotation is continuously provided. If the result is affirmative (S504: YES), the main CPU 41 transmits, to the sub CPU 61, code Nos. of the reels which were stored in the RAM 43 (step S505). Upon the receipt of code Nos. of reels from the main CPU 41, the sub CPU 61 converts the code Nos. to the stop positions of reels from index (step Nos.), based upon a correlation table between the number of steps and code Nos. stored in the ROM (not shown) included in the sub CPU 61.

FIG. 18 is a schematic view showing a correlation table between the number of steps and code Nos. For code Nos., the corresponding indexes and the number of steps are associated with each other. Code Nos. correspond to the symbols drawn on the outer periphery of reels 14, and the symbols of code Nos. "00" to "10" correspond to index 1, and those of code Nos. "11" to "21" correspond to index 2. Further, the number of steps in the correlation table, shown in FIG. 18, is determined in a case where index 1 is defined as a reference. For example, if code No. is "08", 145 steps from index 1 are equivalent to reel stop positions. Further, if code No. is "12", 218 steps from index 1 are equivalent to reel stop positions.

Next, the sub CPU 61 executes reel stop processing (step S507). In this processing operation, the sub CPU 61 detects, for each of the reels 14, a rising edge (index 1) from "Low" to "High" in the index detection circuit 65. Then, this sub CPU supplies to the motor driving circuit 65 the pulses which are equivalent to the number of steps converted from code Nos. at step S52, with a timing with which index 1 was detected. After that, the sub CPU stops supplying pulses.

For example, at step S506, if the reel stop position is determined to be 145 steps from index 1, the sub CPU 61 supplies 145 pulses to the motor driving circuit 65 with the timing with which index 1 was detected. After that, this sub CPU stops supplying pulses. Further, at step S52, if the reel stop position is determined to be 21 steps from index 1, the sub CPU 61 supplies 218 pulses to the motor driving circuit 65, with the timing with which index 1 was detected. As the result thereof, the reels 14 stop in the line with the code Nos. determined at step S402 of FIG. 15, and then, a combination of symbols corresponding to the winning combination determined at step S402 of FIG. 15 is displayed in a stopped state on the payline L. On the other hand, the main CPU 41 terminates an effect at the time of reel rotation (step S508). After terminating the processing operations at steps S507 and S508, the main CPU 41 terminates this processing operation.

If the index corresponding to code No. transmitted at step S505 is different from that detected by means of the index detection circuit 65 when rotation of the reels 14 has stopped, step-out of the reels 14 arises. Thus, the main CPU 41 performs processing, for example, of displaying an error message on the lower image display panel 16, and then, cancels a game. For example, this CPU cancels a game, if index 1 is detected by means of the index detection circuit 65 when rotation of the reel 14L has stopped in spite of the fact that the processing of stopping the reel 14L with code No. 12 corresponding to index 2 was performed.

Figure 19:
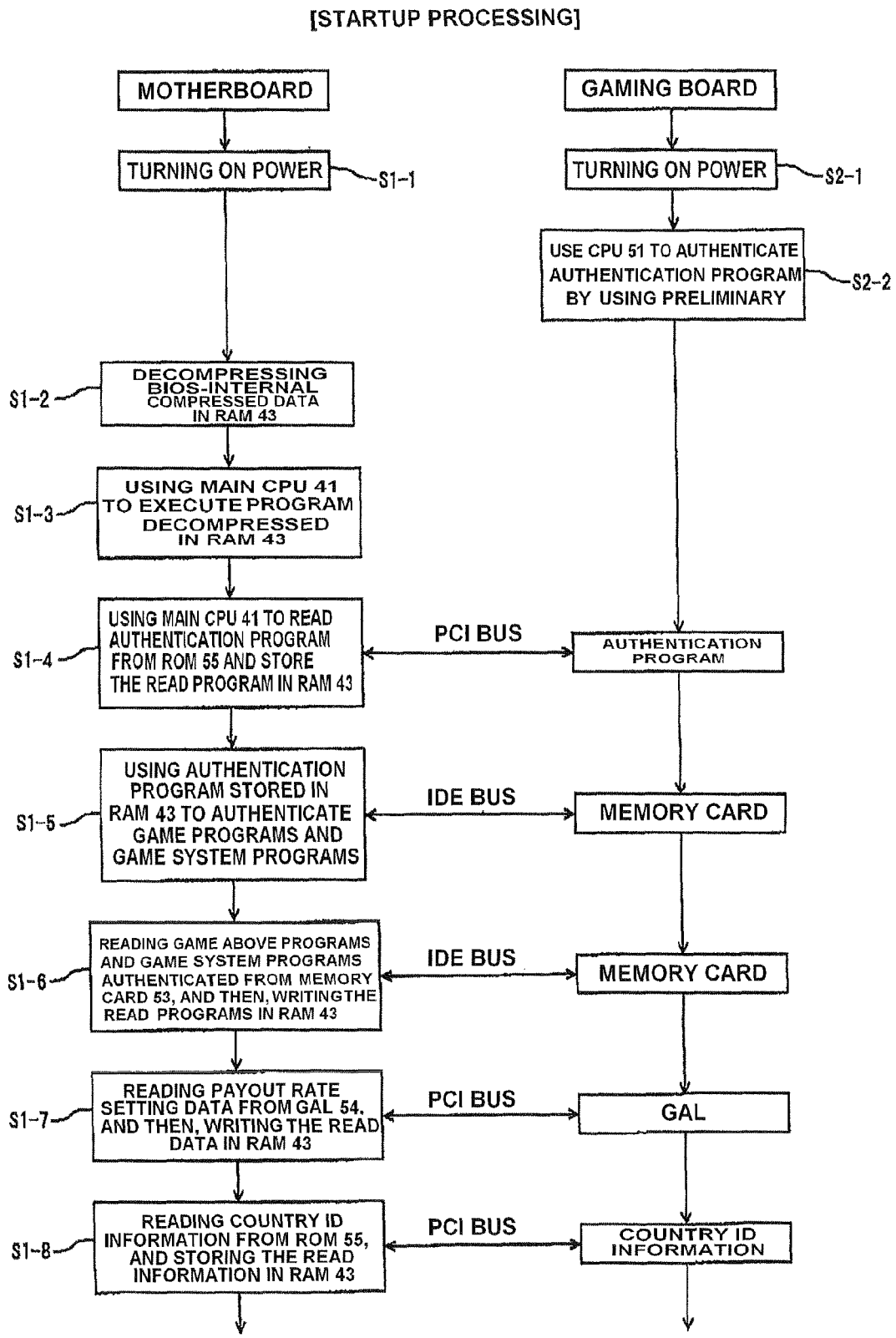
FIG. 19 is a flowchart showing procedures for executing startup processing.

Lastly, startup processing, which is invoked at step S110 in the main routine shown in FIG. 9, will be described. FIG. 19 is a flowchart showing procedures for performing startup processing. This flowchart of operation shows procedures for performing authentication read processing of the game programs and game system programs depending upon the motherboard 40 and the gaming board 50. A memory card 53 is inserted into a card slot 53S in a gaming board 50, and a GAL 54 is mounted to an IC socket 54S.

When a power switch is turned ON (power is supplied) in a power unit 45, the motherboard 40 and the gaming board 50 are started up (steps S1-1, S2-1). When they are started up, individual processing operations are performed, respectively. That is, on the gaming board 50, the CPU 51 reads a preliminary authentication program stored in the boot ROM 52. In accordance with the read preliminary authentication program, this CPU performs preliminary authentication to verify and certify in advance that an authentication program is not falsified, before data capturing in the motherboard 40 (step S2-2). On the other hand, on the motherboard 40, the main CPU 41 executes a BIOS stored in the ROM 42, and then, decomposes in the RAM 43 the compressed data incorporated in the BIOS (step S1-2). After that, the main CPU 41 executes the BIOS decompressed in the RAM 43, and diagnoses and initializes various peripheries (step S1-3).

To the main CPU 41, a ROM 55 of the gaming board 50 is connected via a PCI bus. The main CPU 41 performs processing of reading the authentication program stored in the ROM 55 and storing the read authentication program in the RAM 43 (step S1-4). At this time, the main CPU 41 takes a check sum by means of an ADD SUM system (standard check function) in accordance with the standard BIOS functions, and then, causes the RAM 43 to store the authentication program, while performing verification processing of whether or not storing operation is reliably performed without any mistake.

Next, the main CPU 41 provides an access to the memory card 53 inserted into the card slot 53S via an IDE bus after verifying what is connected to the IDE bus, and then, reads the game programs and the game system programs from the memory card 53. In this case, the main CPU 41 reads, on a four-by-four-bytes basis, data constituting the game programs and the game system programs. Subsequently, the main CPU 41 performs authentication to verify and certifies that the read game programs and game system programs are not falsified, in accordance with the authentication program stored in the RAM 43 (steps S1-5). When this authentication processing normally terminates, the main CPU 41 causes the RAM 43 to write and store the (authenticated) game programs and game system programs targeted for authentication (steps S1-6). Next, the main CPU 41 provides an access to the GAL 54 mounted to the IC socket 54S via the PCI bus; reads payout rate setting data; and causes the RAM 43 to write and store the data (steps S1-7). Next, the main CPU 41 performs processing of reading country ID information stored in the ROM 55 of the gaming board 50 and causing the RAM 43 to store the read country ID information (steps S1-8).

After performing such startup processing, the main CPU 41 sequentially reads and executes the game programs and game system programs, thereby conducting the abovementioned game.

As described above, in the embodiment, the number of times of executing a base game is counted, and then, a countdown effect is rendered during a time interval from a time point at which the counted number of times reached the first predetermined value Th1 (for example, 990) to a time point at which it reached the second predetermined value Th2 (for example, 1,000), i.e., a time interval that took until a new game (free game) is started. If the number of times of executing a base game reached the second predetermined value Th2, a game (free game) is started which is performed even if gaming mediums such as coins, bills, or electronic securities information equivalent thereto, are not betted. This free game is a game which the player is allowed to play without need to bet any gaming mediums, and the objective thereof is to return gaming mediums to the players.

On the common display device 200, based upon the notification from each of the gaming machines 100, judgment is made as to whether or not there exist a plurality of gaming machines 10 at which countdown effects were started. If the judgment result is affirmative, the countdown effect of any of the gaming machines 10 with the fewest base game count to be performed until a transfer to the free game, i.e., that of any of the gaming machines with the smallest remaining counted number of the countdowns, is preferentially rendered on the common display device 200.

Therefore, even if a large number of gaming mediums were consumed by the play of games over a long period of time, the games can be further performed even if no gaming mediums are betted (i.e., with no charge), by performing them until the game count reaches a specific number of times (the second predetermined value). Accordingly, it is possible to prevent players, who consumed a large number of gaming mediums, from raising discomfort or mistrust to the games or from losing interest or concern relevant to the play of games.

If the game count is close to a specific count (second predetermined value Th2), a countdown effect is rendered at each of the gaming machines, thereby allowing the players to raise their interest or concern relevant to the play of games. In the abovementioned system, further, if there exist a plurality of gaming machines 10 at which the countdown effect is rendered, the countdown effect of any of the gaming machines 10 at which the game count is the closest to the specific count, i.e., that of any of the gaming machines 10 at which the largest number of games were performed, is preferentially rendered on the common display device. Thus, the player, who plays games at the gaming machine 10, is allowed to have the sense of superiority to other players. Further, since it is predicted that one player competes against other players in order to have the sense of superiority, it is possible to prompt each of the players to bet gaming mediums and to raise the profits of the game arcades in which the above gaming system is installed.

While, in the present embodiment, the first predetermined value Th1 is set at 990, and the second predetermined value Th2 is set at 1,000, these predetermined values are not limitative thereto in particular. For example, the first predetermined value may be set at 1 in order to start a countdown effect from an initial state in which an insurance-on mode is established. Further, the predetermined values may be randomly set by the random number value every time transfer to the insurance-on mode is performed.

The free game in the present invention can be designed as required without being limitative in particular, as long as it is performed even if no gaming mediums are betted. The present embodiment defines the rule of the free game as a game (regularly performed in a slot machine) in which a plurality of symbols drawn on the reels 14 are displayed in a stopped state after they are variably displayed, and then, a payment amount is determined according to the symbols displayed in a stopped state or a combination of the displayed symbols. However, the free game in the present invention is not limitative thereto, and games, which are different from the slot machine, may be performed. For example, card games such as poker or other games such as a shooting game or a martial art game may be performed. At this time, these games may be performed only once, or alternatively, may be repeatedly performed over a plurality of times.

While the present embodiment described a case of using the mechanical reels 14, symbols may be displayed on a display device such as a liquid crystal display device in place of the mechanical reels 14 in the present invention.

The above-described embodiments of the present invention merely provide specific examples, and does not limit the invention in particular, and the design of specific features such as means can be modified as required. Further, advantageous effects described in the embodiments of the present invention are merely exemplified as the most preferable effects derived from the present invention. The advantageous effects according to the present invention are not limitative to those described in the embodiments thereof.

What is claimed is:
1. A gaming system, comprising:
a plurality of gaming machines; and
a common display device connected to the gaming machines,
wherein each of the plurality of gaming machines includes:
  a housing;
  a plurality of input devices supported by the housing, the plurality of input devices including a value-addition mechanism by which gaming media associated with monetary value can be added to the gaming machine; a wager button; and a cash-out button;
  a validator;
  an award payout mechanism that pays out gaming media;
  a gaming machine display device for displaying a plurality of symbols;
  a gaming machine controller, which, via the validator, identifies gaming media that has been added to the gaming machine; which establishes a credit balance for a player based at least in part on gaming media that has been added to the gaming machine; and which, as a result of a player having wagered gaming media, performs processes of:
    (a) executing a base game in which symbols arranged on the gaming machine display device are rearranged after a gaming medium has been betted, and thereafter, a payment is made in accordance with the rearranged symbols;
    (b) counting the number of times the base game is executed;
    (c) once the number of times the base game is executed has reached a first predetermined value, causing the gaming machine display device to display a countdown effect image stored in a gaming machine memory as the base game is played succeeding times and until the number of times the base game is executed reaches a second predetermined value, the countdown effect image displaying a counting down of the number of games remaining to be played before a free game is reached;
    (d) when the number of times the base game is played has reached the second predetermined value, transferring the base game to the free game executed without betting a gaming medium; and
    (e) awarding a payout of gaming media, if any, in accordance with a game result; and
  a gaming machine communication interface for communicating to the common display device the gaming-machine-controller-counted number of times the base game has been executed, and
wherein the common display device includes:
  a common display device communication interface for receiving from each of the plurality of gaming machines the respective gaming-machine-controller-counted number of times the base game has been executed;
  a common display device memory for storing a respective countdown effect image associated with each of the plurality of gaming machines; and
  a common display device controller, which performs processes of:
    (a') determining whether the number of times the base game is executed has reached the first predetermined value at two or more of said plurality of gaming machines and, if so,
    (b') displaying the countdown effect image associated with a lead gaming machine for which the number of times the base game is executed is closest to reaching the second predetermined value, the countdown effect image associated with the lead gaming machine displaying a counting down of the number of games remaining to be played at said lead gaming machine before a free game is reached at said lead gaming machine, but not displaying the countdown effect image or images associated with the other gaming machine or machines for which the number of times the base game is executed has reached the first predetermined value.

2. The gaming system according to claim 1, wherein:
the countdown effect image displayed on the gaming machine display device of each of the plurality of gaming machines is analogous to the countdown effect image displayed on the common display device.

3. The gaming system according to claim 1, wherein:
the controller of the common display device performs processes of:
  (a) judging whether or not transfer to the free game is accomplished at one of said plurality of gaming machines at which the countdown effect image is displayed on the common display device; and
  (b) changing a display image to a countdown effect image associated with another of said plurality of gaming machines in a case where it is judged that the transfer to the free game is accomplished at said one of said plurality of gaming machines.

4. The gaming system according to claim 1, wherein:
the controller of the common display device performs processes of:
  (a) judging whether or not the number of times of executing the base game at one of said plurality of gaming machines for which the countdown effect image is displayed on the common display device is equal to the number of times of executing the base game at another of said plurality of gaming machines; and (b) simultaneously or alternately displaying the countdown effect images of both said one and said another of the plurality of gaming machines in a case where it is judged that the numbers of times of executing the base game at both said one and said another of the plurality of gaming machines becomes equal to each other.

5. The gaming system according to claim 4, wherein:
the controller of the common display device performs processes of:
(a) judging whether or not the number of times of executing the base game at one of the plurality of gaming machines is greater than the number of times of executing the base game at another of the plurality of gaming machines when the countdown effect images are displayed at both said one and said another of the plurality of gaming machines; and
(b) canceling display of the countdown effect image at said another of the plurality of gaming machines in a case where it is judged that the number of times of executing the base game at said one of the plurality of gaming machine is greater than the number of times of executing the base game at said another of the plurality of gaming machines.

6. The gaming system according to claim 1, wherein:
the gaming machine controller of each of the plurality of gaming machines executes a process of starting communication of the number of times of executing the base game to the common display device in a case where the counted number of times of the base game reaches a third predetermined value which is equal to or smaller than the first predetermined value.

7. A gaming system, comprising:
a plurality of gaming machines; and
a common display device connected to the gaming machines,
wherein each of the plurality of gaming machines includes:
a housing;
a plurality of input devices supported by the housing, the plurality of input devices including a value-addition mechanism by which gaming media associated with monetary value can be added to the gaming machine; a wager button; and a cash-out button;
a validator;
an award payout mechanism that pays out gaming media;
a gaming machine display device for displaying a plurality of symbols;
a gaming machine controller, which, via the validator, identifies gaming media that has been added to the gaming machine; which establishes a credit balance for a player based at least in part on gaming media that has been added to the gaming machine; and which, as a result of a player having wagered gaming media, performs processes of:
(a) executing a base game in which symbols arranged on the display are rearranged after a gaming medium has been betted, and thereafter, a payment is made in accordance with the rearranged symbols;
(b) counting the number of times the base game is executed;
(c) once the number of times the base game is executed has reached a first predetermined value, causing the gaming machine display device to display a countdown effect image stored in a gaming machine memory as the base game is played succeeding times and until the number of times the base game is executed reaches a second predetermined value, the countdown effect image displaying a counting down of the number of games remaining to be played before a free game is reached;
(d) when the number of times the base game is played has reached the second predetermined value, transferring the base game to the free game executed without betting a gaming medium; and
(e) awarding a payout of gaming media, if any, in accordance with a game result; and
a gaming machine communication interface for communicating to the common display device the gaming-machine-controller-counted number of times the base game has been executed, and
wherein the common display device includes:
a common display device communication interface for receiving from each of the plurality of gaming machines the respective gaming-machine-controller-counted number of times the base game has been executed;
a common display device memory for storing a respective countdown effect image associated with each of the plurality of gaming machines; and
a common display device controller, which performs processes of:
(a') determining whether the number of times the base game is executed has reached the first predetermined value at two or more of said plurality of gaming machines and, if so,
(b') displaying the countdown effect image associated with a lead gaming machine for which the number of times the base game is executed is closest to reaching the second predetermined value, the countdown effect image associated with the lead gaming machine displaying a counting down of the number of games remaining to be played at said lead gaming machine before a free game is reached at said lead gaming machine, but not displaying the countdown effect image or images associated with the other gaming machine or machines for which the number of times the base game is executed has reached the first predetermined value;
(c') judging whether or not transfer to the free game is accomplished at one of said plurality of gaming machines for which the countdown effect image is displayed on the common display device; and
(d') changing a display image to the countdown effect image associated with another of said plurality of gaming machines in a case where it is judged that the transfer to the free game is accomplished at said one of the plurality of gaming machines.

8. A gaming system, comprising:
a plurality of gaming machines; and
a common display device connected to the gaming machines,
wherein each of the plurality of gaming machines includes:
a housing;
a plurality of input devices supported by the housing, the plurality of input devices including a value-addition mechanism by which gaming media associated with monetary value can be added to the gaming machine; a wager button; and a cash-out button;
a validator;
an award payout mechanism that pays out gaming media;
a display device for displaying a plurality of symbols;
a gaming machine controller, which, via the validator, identifies gaming media that has been added to the gaming machine; which establishes a credit balance for a player based at least in part on gaming media that has been added to the gaming machine; and which, as a result of a player having wagered gaming media, performs processes of:

(a) executing a base game in which symbols arranged on the display device are rearranged after a gaming medium has been betted, and thereafter, a payment is made in accordance with the rearranged symbols;

(b) counting the number of times the base game has been executed;

(c) once the number of times the base game is executed has reached a first predetermined value, causing the gaming machine display device to display a countdown effect image stored in a gaming machine memory as the base games is played succeeding times and until the number of times the base game is executed reaches a second predetermined value, the countdown effect image displaying a counting down of the number of games remaining to be played before a free game is reached;

(d) when the number of times the base game is played has reached the second predetermined value, transferring the base game to the free game executed without betting a gaming medium; and (e) awarding a payout of gaming media, if any, in accordance with a game result; and a gaming machine communication interface for communicating to the common display device the gaming-machine-controller-counted number of times the base game has been executed, and wherein the common display device includes:

a common display device communication interface for receiving from each of the plurality of gaming machines the respective gaming-machine-controller-counted number of times the base game has been executed;

a common display device memory for storing a respective countdown effect image associated with each of the plurality of gaming machines; and a common display device controller, which performs processes of:

(a') determining whether the number of times the base game is executed has reached the first predetermined value at two or more of said plurality of gaming machines and, if so, (b') displaying the countdown effect image associated with a lead gaming machine for which the number of times the base game is executed is closest to reaching the second predetermined value, the countdown effect image associated with the lead gaming machine displaying a counting down of the number of games remaining to be played at said lead gaming machine before a free game is reached at said lead gaming machine, but not displaying the countdown effect image or images associated with the other gaming machine or machines for which the number of times the base game is executed has reached the first predetermined value;

(c') judging whether or not the number of times of executing the base game at one of the plurality of gaming machines for which the countdown effect image is displayed on the common display device is equal to the number of times of executing the base game at another of the plurality of gaming machines;

(d') simultaneously or alternately displaying the countdown effect images of both said one and said another of the plurality of gaming machines in a case where it is judged that the numbers of times of executing the base game at both said one and said another of the plurality of gaming machines becomes equal to each other;

(e') judging whether or not the number of times of executing the base game at one of the plurality of gaming machines is greater than the number of times of executing the base game at another of the plurality of gaming machines when the countdown effect images are displayed at both said one and said another of the plurality of gaming machines; and (f') canceling display of the countdown effect image at said another of the plurality of gaming machines in a case where it is judged that the number of times of executing the base game at said one of the plurality of gaming machine is greater than the number of times of executing the base game at said another of the plurality of gaming machines.

9. A gaming system, comprising:

a plurality of gaming machines; and a common display device connected to the gaming machines, wherein each of the plurality of gaming machines includes:

a housing;

a plurality of input devices supported by the housing, the plurality of input devices including a value-addition mechanism by which gaming media associated with monetary value can be added to the gaming machine; a wager button; and a cash-out button;

a validator;

an award payout mechanism that pays out gaming media;

a display device for displaying a plurality of symbols;

a gaming machine controller, which, via the validator, identifies gaming media that has been added to the gaming machine; which establishes a credit balance for a player based at least in part on gaming media that has been added to the gaming machine; and which, as a result of a player having wagered gaming media, performs processes of:

(a) executing a base game in which symbols arranged on the gaming machine display device are rearranged after a gaming medium has been betted, and thereafter, a payment is made in accordance with the rearranged symbols;

(b) counting the number of times of the base game is executed;

(c) once the number of times the base game is executed has reached a first predetermined value, causing the gaming machine display device to display a countdown effect image stored in a gaming machine memory as the base game is played succeeding times and until the number of times the base game is executed reaches a second predetermined value, the countdown effect image displaying a counting down of the number of games remaining to be played before a free game is reached;

(d) when the number of times the base game is played has reached the second predetermined value, transferring the base game to the free game executed without betting a gaming medium; and
(e) awarding a payout of gaming media, if any, in accordance with a game result; and a gaming machine communication interface for starting communication to the common display the gaming-machine-controller-counted number of times the base game has been executed in a case where the number of times the base game has been executed reaches a third predetermined value that is smaller than the first predetermined value, and wherein the common display device includes:

a common display device communication interface for receiving from each of the plurality of gaming machines the respective gaming-machine-controller-counted number of times the base game has been executed;

a common display device memory for storing a respective countdown effect image associated with each of the plurality of gaming machines; and a common display device controller, which performs processes of:
(a') determining whether the number of times the base game is executed has reached the first predetermined value at two or more of said plurality of gaming machines and, if so,
(b') displaying the countdown effect image associated with the gaming machine for which the number of times the base game is executed is closest to reaching the second predetermined value, the countdown effect image associated with the lead gaming machine displaying a counting down of the number of games remaining to be played at said lead gaming machine before a free game is reached at said lead gaming machine, but not displaying the countdown effect image or images associated with the other gaming machine or machines for which the number of times the base game is executed has reached the first predetermined value.

* * * * *